US007623167B2

(12) United States Patent
Sasaki

(10) Patent No.: US 7,623,167 B2
(45) Date of Patent: Nov. 24, 2009

(54) WAVELENGTH COMPONENT PROPORTION DETECTION APPARATUS AND IMAGE-PICKUP APPARATUS

(75) Inventor: Daisuke Sasaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 663 days.

(21) Appl. No.: 11/534,881

(22) Filed: Sep. 25, 2006

(65) Prior Publication Data

US 2007/0070224 A1    Mar. 29, 2007

(30) Foreign Application Priority Data

Sep. 26, 2005   (JP)   ............................. 2005-278634

(51) Int. Cl.
  *H04N 3/14*  (2006.01)
  *H04N 5/33*  (2006.01)
  *G02B 1/10*  (2006.01)
  *G02B 5/08*  (2006.01)
(52) U.S. Cl. ........................ 348/273; 348/164; 359/586; 359/359
(58) Field of Classification Search ................ 348/273, 348/164, 279–280, 234; 359/586–589, 359–360; 438/70; 430/46.3; 250/226
See application file for complete search history.

(56) References Cited

U.S. PATENT DOCUMENTS

| 7,064,775 | B2* | 6/2006 | Takakuwa | .................... 348/164 |
| 2007/0182836 | A1* | 8/2007 | Chino | ........................ 348/273 |
| 2008/0191298 | A1* | 8/2008 | Lin et al. | ..................... 257/432 |
| 2009/0147112 | A1* | 6/2009 | Baldwin | ...................... 348/273 |

FOREIGN PATENT DOCUMENTS

JP        2003-219254        7/2003

* cited by examiner

*Primary Examiner*—Timothy J Henn
*Assistant Examiner*—Mekonnen Dagnew
(74) *Attorney, Agent, or Firm*—Rossi, Kimms & McDowell LLP

(57) ABSTRACT

A wavelength component proportion detection apparatus is disclosed which is capable of detecting the proportions of the wavelength components under a light source including the visible and infrared wavelength components. The apparatus comprises a color filter, an image-pickup element, an extractor which extracts a color-difference signal from an image-pickup signal, and a detector which detects, on the basis of the extracted color-difference signal, the proportion of a wavelength component in a first infrared wavelength region and the proportion of a wavelength component in a second infrared wavelength region in the light from the light source.

14 Claims, 21 Drawing Sheets

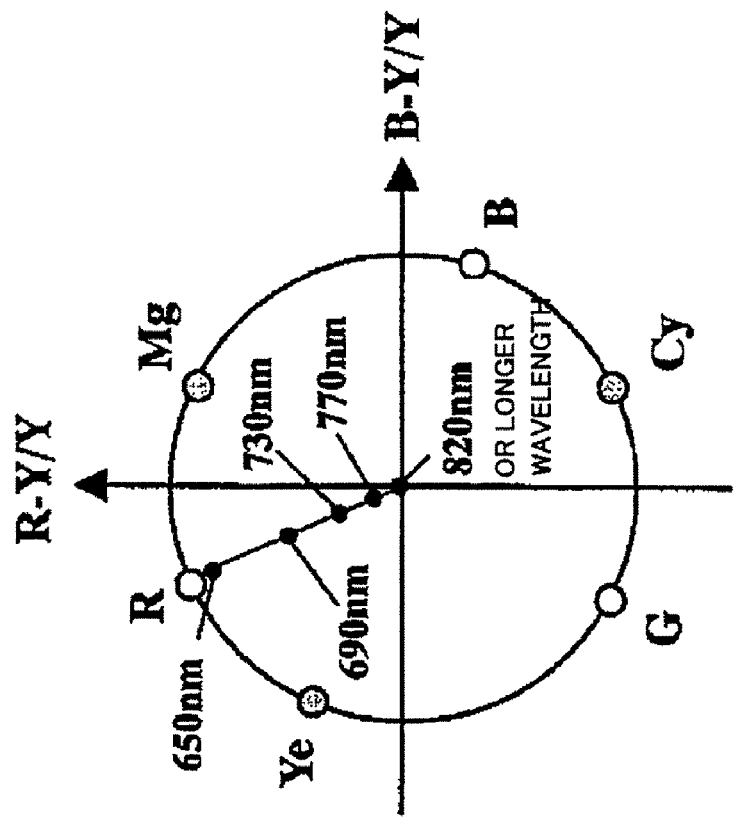
FIG. 15B  COMPLEMENTARY-COLOR FILTER
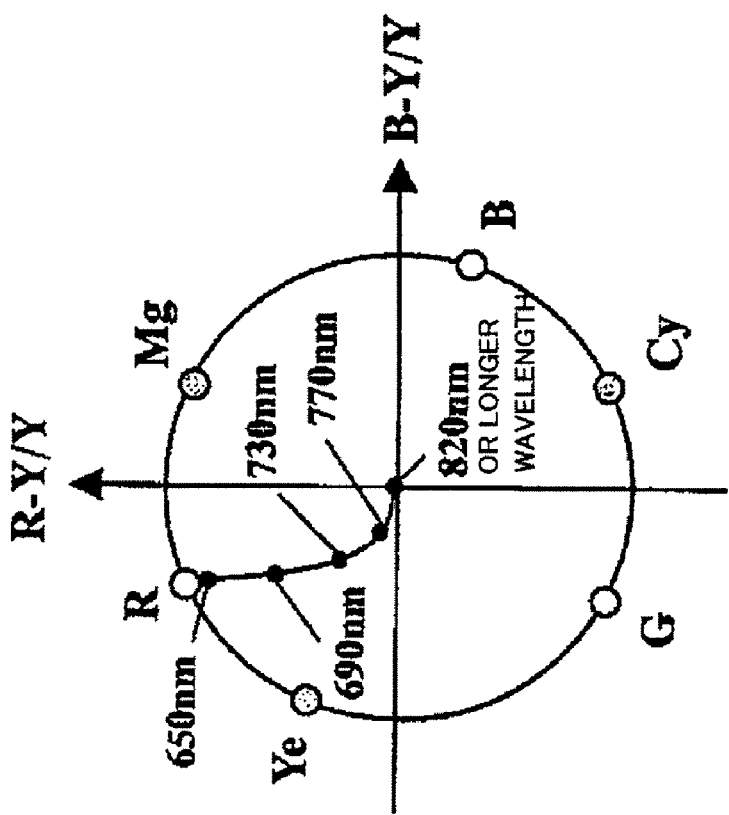
FIG. 15A  PRIMARY-COLOR FILTER

WAVELENGTH COMPONENT PROPORTION DETECTION APPARATUS AND IMAGE-PICKUP APPARATUS

BACKGROUND OF THE INVENTION

The present invention relates to a proportion detection apparatus which detects proportions of wavelength components contained in a light source that irradiates an object on the basis of an image-pickup signal obtained by photoelectric conversion of light with wavelengths from a visible wavelength region to an infrared wavelength region, and to an image-pickup apparatus using the proportion detection apparatus.

Cameras having an image pickup mode change function have been disclosed in Japanese Patent Laid-Open No. 2003-219254 for example, which are image-pickup apparatuses having an image pickup region extended from a visible wavelength region to an infrared wavelength region. The camera disclosed in this publication relates to an infrared/visible light camera in which insertion/removal of an infrared cutting filter is automatically performed when the image pickup mode is changed, and in which the image pickup mode is determined on the basis of a luminance signal and color information obtained from an image-pickup element.

The image pickup mode is determined by a method described below. When a color image pickup mode is to be selected as the present image pickup mode, it is determined by determining the magnitude relationship between a luminance signal Y and a predetermined threshold value Y2.

When a black-and-white image pickup mode is to be selected as the present image pickup mode, it is determined by determining the magnitude relationship between the luminance signal Y and a predetermined threshold value Y1.

The threshold values Y1 and Y2 are set in a relationship: Y1>Y2 to prevent hunting which is repetition of mode change: color image pickup mode→black-and-white image pickup mode→color image pickup mode . . . when the infrared cutting filter is removed.

In the case where the black-and-white image pickup mode is to be selected as the present image pickup mode, analysis of color signals is performed as well as analysis of the luminance signal to determine the image pickup mode.

In analysis of color signals, two color ratios that are a ratio of red and green signals and a ratio of blue and green color signals are obtained and determination is made as to whether or not the image-pickup signal is obtained by near-infrared light according to whether or not the two color ratios fall within specified distribution ranges.

A feature of the image-pickup element in terms of sensitivity characteristics with respect to colors resides in that the sensitivity to light with wavelengths longer than about 800 [nm] is generally constant irrespective of the kind of color.

Accordingly, when the image-pickup signal is obtained by near-infrared light, the two color ratios fall within the specified distribution ranges.

If it is determined that the image-pickup signal is obtained by the near-infrared light, the image pickup mode is maintained in the black-and-white image pickup mode. For analysis of the color signals, the average of each color signal from the entire picked-up image may be used.

A system may be employed in which the picked-up image is divided into a plurality of blocks and determination is made as to whether or not the image-pickup signal is obtained by the near-infrared light with respect to the average of the color signals for each block.

The above-described conventional camera having an infrared cutting filter automatically inserted and removed has been incapable of detecting the proportion of the infrared wavelength component with a wavelength from 650 to 800 [nm] and incapable of detecting the proportions of the visible and infrared wavelength components included in light from a light source.

There is, therefore, a problem that the luminance on a colored picked-up image after insertion of the infrared cutting filter that was removed is unstable under a mixed light source including both the visible and infrared wavelength components, such as an incandescent lamp or sunlight.

BRIEF SUMMARY OF THE INVENTION

An object of the present invention is to provide a wavelength component proportion detection apparatus capable of detecting the proportions of the wavelength components under a light source including the visible and infrared wavelength components such as an incandescent lamp or sunlight and an image-pickup apparatus with the same.

According to an aspect, the present invention provides a wavelength proportion detection apparatus which comprises a color filter which transmits light from an object irradiated with light from a light source, an image-pickup element which outputs an image-pickup signal by converting light in a visible wavelength region and light in an infrared wavelength region transmitted through the color filter into an electrical signal, an extractor which extracts a color-difference signal from the image-pickup signal, and a detector which detects, on the basis of the extracted color-difference signal, the proportion of a wavelength component in a first infrared wavelength region and the proportion of a wavelength component in a second infrared wavelength region in the light from the light source. The first infrared wavelength region is a region in which the transmittance of the color filter for a red wavelength component is higher than the transmittances of the color filter for blue and green wavelength components, and the second infrared wavelength region is a region in which the difference between the transmittance of the color filter for the red wavelength component and the transmittances of the color filter for the blue and green wavelength components is smaller than that in the first infrared wavelength region.

According to another aspect, the present invention provides a wavelength proportion detection apparatus which comprises a color filter which transmits light from an object irradiated with light from a light source, an image-pickup element which outputs an image-pickup signal by converting light in a visible wavelength region and light in an infrared wavelength region transmitted through the color filter into an electrical signal, an extractor which extracts a color-difference signal and a luminance signal from the image-pickup signal, and a detector which detects, on the basis of the ratio of the extracted color-difference signal and luminance signal, the proportion of a wavelength component in a first infrared wavelength region and the proportion of a wavelength component in a second infrared wavelength region in the light from the light source. The first infrared wavelength region is a region in which the transmittance of the color filter for a red wavelength component is higher than the transmittances of the color filter for blue and green wavelength components, and the second infrared wavelength region is a region in which the difference between the transmittance of the color filter for the red wavelength component and the transmittances of the color filter for the blue and green wavelength components is smaller than that in the first infrared wavelength region.

According to still another aspect, the present invention provides an image-pickup apparatus which comprises one of the above proportion detection apparatuses, a filter transfer mechanism which inserts an infrared cutting filter in an optical path between an image-pickup optical system and the color filter, and which removes the infrared cutting filter from the optical path, a luminance calculator which calculates luminance of the visible wavelength component on the basis of a luminance signal obtained from the image pickup signal and the proportions of the wavelength components in the first and second infrared wavelength regions in the light from the light source which are obtained by the proportion detection apparatus, and a controller which operates the filter transfer mechanism on the basis of the calculated luminance of the visible wavelength component.

According to yet another aspect, the present invention provides a wavelength proportion detection method using a color filter which transmits light from an object irradiated with light from a light source, and an image-pickup element which outputs an image-pickup signal by converting light in a visible wavelength region and light in an infrared wavelength region transmitted through the color filter into an electrical signal. The method comprises the steps of extracting a color-difference signal from the image-pickup signal, and detecting, on the basis of the extracted color-difference signal, the proportion of a wavelength component in a first infrared wavelength region and the proportion of a wavelength component in a second infrared wavelength region in the light from the light source. The first infrared wavelength region is a region in which the transmittance of the color filter for a red wavelength component is higher than the transmittances of the color filter for blue and green wavelength components, and the second infrared wavelength region is a region in which the difference between the transmittance of the color filter for the red wavelength component and the transmittances of the color filter for the blue and green wavelength components is smaller than that in the first infrared wavelength region.

According to still further another aspect, the present invention provides a wavelength proportion detection method using a color filter which transmits light from an object irradiated with light from a light source, and an image-pickup element which outputs an image-pickup signal by converting light in a visible wavelength region and light in an infrared wavelength region transmitted through the color filter into an electrical signal. The method comprises the steps of extracting a color-difference signal and a luminance signal from the image-pickup signal, and detecting, on the basis of the ratio of the extracted color-difference signal and luminance signal, the proportion of a wavelength component in a first infrared wavelength region and the proportion of a wavelength component in a second infrared wavelength region in the light from the light source. The first infrared wavelength region is a region in which the transmittance of the color filter for a red wavelength component is higher than the transmittances of the color filter for blue and green wavelength components, and the second infrared wavelength region is a region in which the difference between the transmittance of the color filter for the red wavelength component and the transmittances of the color filter for the blue and green wavelength components is smaller than that in the first infrared wavelength region.

Other objects and features of the present invention will become readily apparent from the following description of the preferred embodiments with reference to accompanying drawings.

BRIEF DESCRIPTION OF THE DRAWINGS

FIGS. 15A and 15B are diagrams showing a definition line and specified coordinates in an orthogonal coordinate system formed by R-Y/Y and B-Y/Y axes representing the ratios of the color-difference signal and the luminance signal;

DETAILED DESCRIPTION OF THE PREFERRED EMBODIMENTS

Preferred embodiments of the present invention will be described with reference to the accompanying drawings.

The basic concept of the present invention will first be described.

Figure 1:
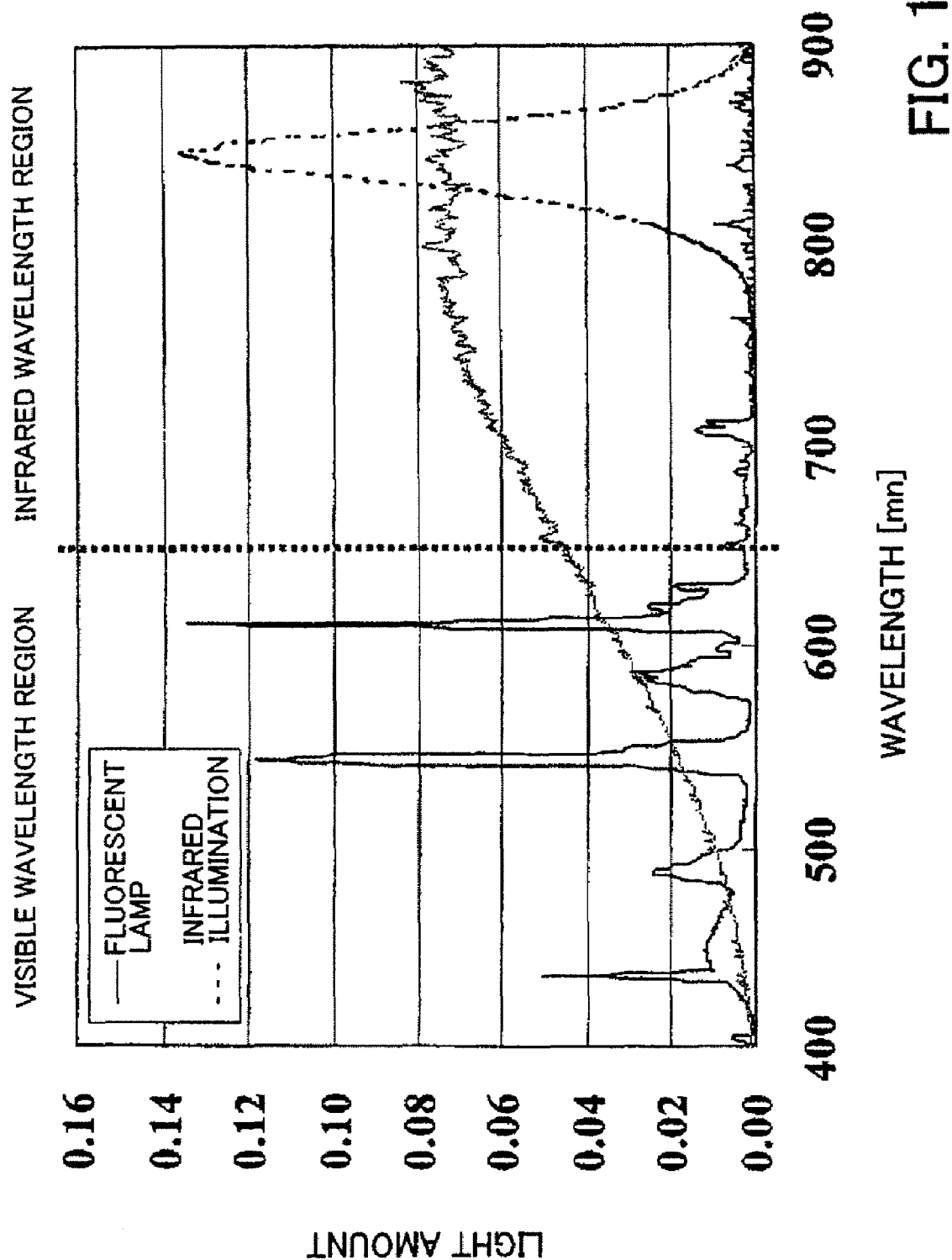
FIG. 1 is a characteristic diagram showing the proportions of the amounts of wavelength components in different light source.

FIG. 1 shows different proportions of amounts of wavelength components in light sources. The cut wavelength range of an ordinary infrared cutting filter is about 650 [nm]. When the infrared cutting filter is inserted, the entire amount of the infrared wavelength component with wavelength equal to or longer than 650 [nm] is cut.

In a case where a fluorescent lamp is used as a light source, a change of the amount of light from the light source accompanying insertion of the infrared cutting filter is substantially zero because the light from the light source contains substantially no amount of the infrared wavelength component as described shown in FIG. 1.

In a case where an incandescent lamp or an infrared illumination is used as a light source, the reduction of the amount of light from the light source accompanying insertion of the infrared cutting filter is large because the light from the light source contains a large amount of the infrared wavelength component as shown in FIG. 1.

If the proportion of the infrared wavelength component in the light source can be detected when the infrared cutting filter is removed, calculation of only the amount of the visible wavelength component can be performed when the infrared cutting filter is inserted.

If timing of insertion of the infrared cutting filter is determined on the basis of the calculated amount of visible wavelength component, the luminance on the color image-pickup plane can be stabilized.

A first infrared wavelength region and a second infrared wavelength region are defined on the basis of spectral transmittance characteristics for each color of a primary-color filter or a complementary-color filter in the infrared wavelength region.

Figure 2:
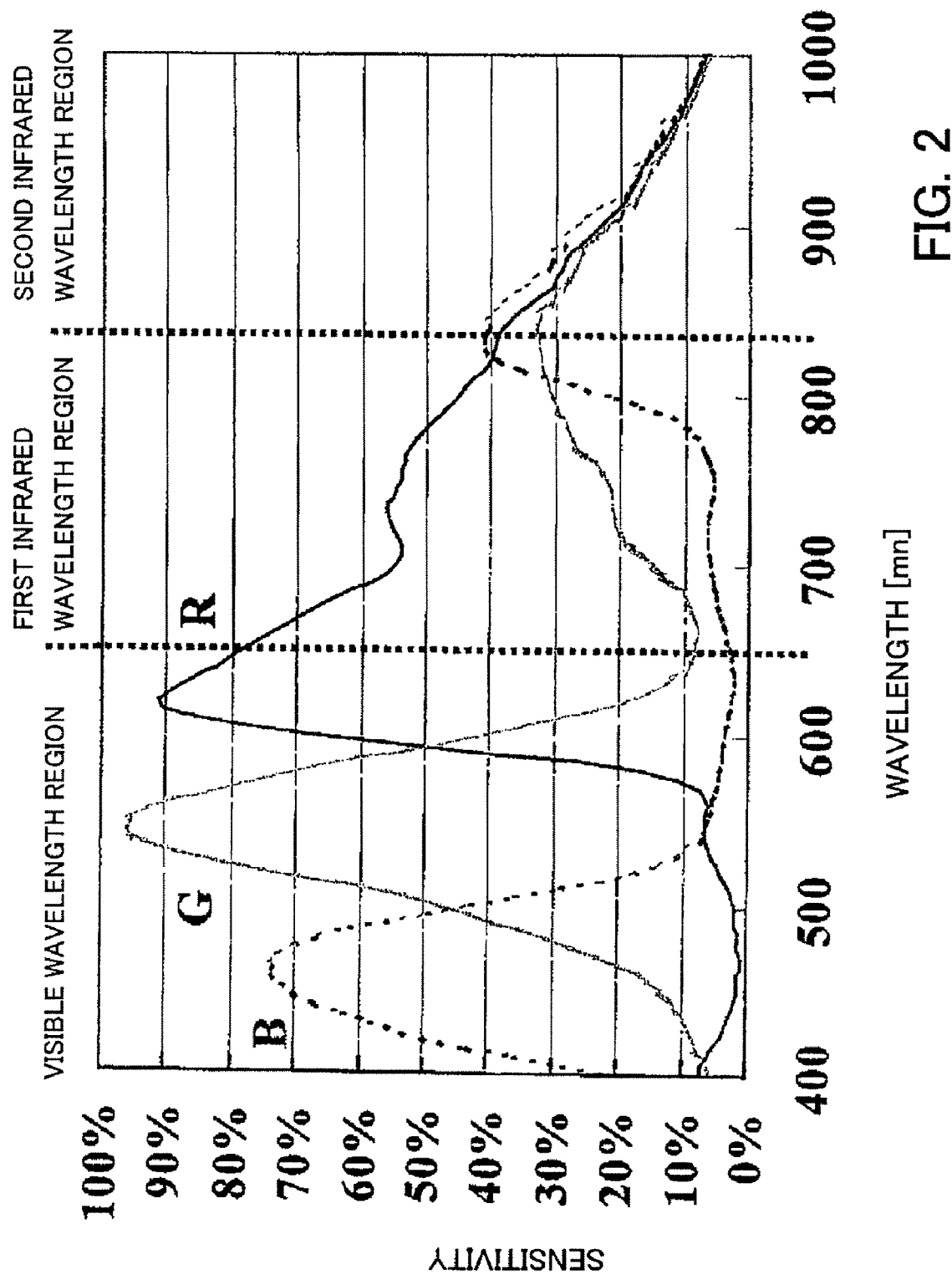
FIG. 2 is a spectral transmittance characteristic diagram of a primary-color filter.
Figure 3:
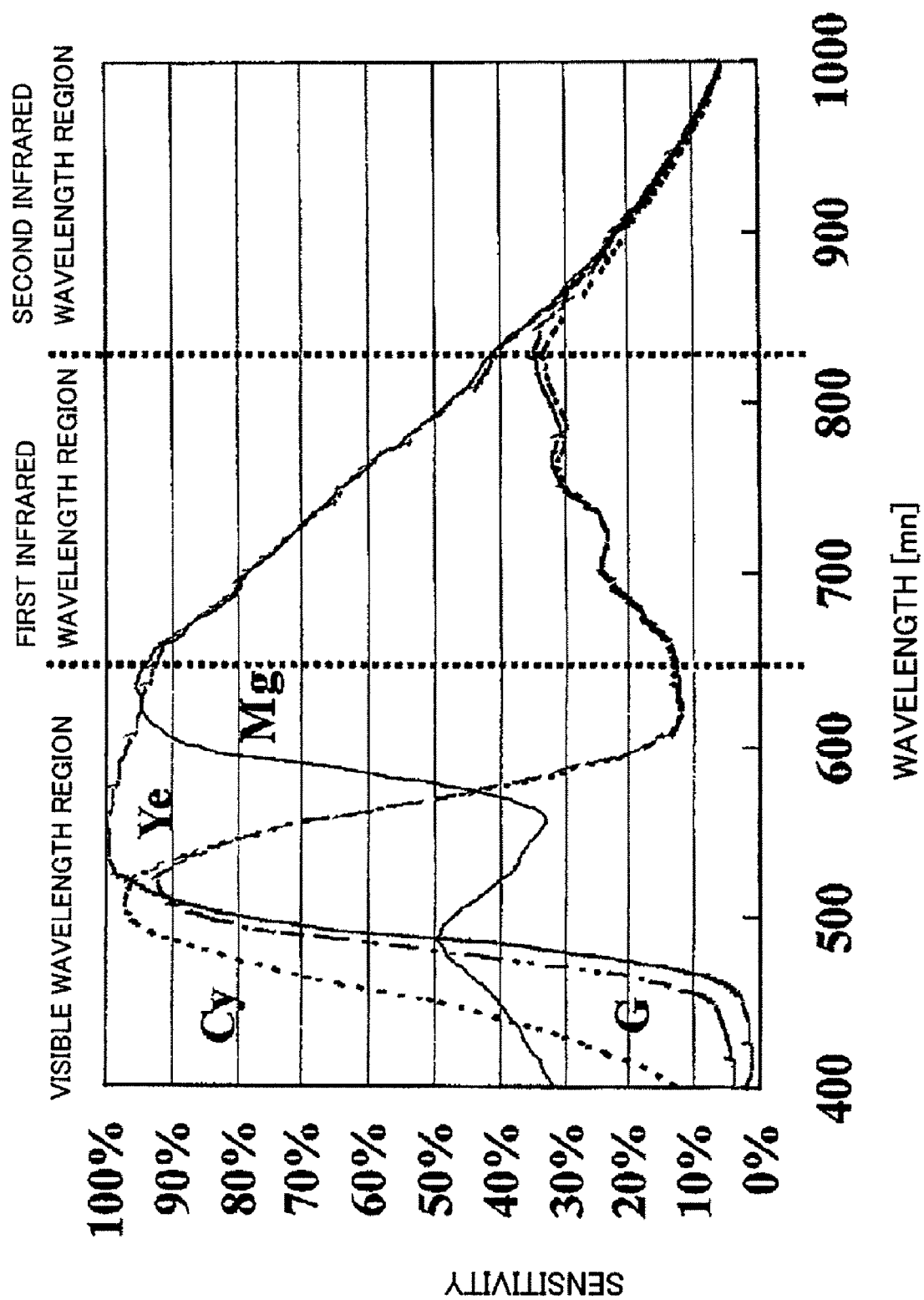
FIG. 3 is a spectral transmittance characteristic diagram of a complementary-color filter.

FIG. 2 is a diagram showing spectral transmittance characteristic of the primary-color filter, and FIG. 3 is a diagram showing spectral transmittance characteristic of the complementary-color filter.

In the wavelength region from about 650 [nm] to about 820 [nm] of the primary-color filter, the highest transmittance is provided for a red wavelength component R, while the transmittance for a green wavelength component G and the transmittance for a blue wavelength component B are low, as shown in FIG. 2. Accordingly, when light having this wavelength component enters an image-pickup element having the primary-color filter placed on its front surface, the red wavelength component is dominant in obtained color information.

In the wavelength region from about 650 [nm] to about 820 [nm] of the complementary-color filter, the transmission characteristic for yellow Ye (R+G) and the transmission characteristic for magenta Mg (R+B) are substantially identical to each other; the highest transmittance is provided for light of these colors, while the transmittance for light of cyan Cy (G+B) is low, as shown in FIG. 3. Accordingly, when light having these wavelength components enters an image-pickup element having the complementary-color filter placed on its front surface, the red wavelength component is also dominant in obtained color information.

This region in which the red wavelength component is dominant will be referred to as the first infrared wavelength region.

In the wavelength region from about 820 [nm] to a longer wavelength of either of the primary-color filter and the complementary-color filter, substantially equal amounts of the three color wavelength components are transmitted as shown in FIGS. 2 and 3.

Accordingly, color information obtained when light having these wavelength components enters an image-pickup element having the primary-color or the complementary-color filter placed on its front surface indicates an achromatic color. This region in which color information indicates an achromatic color will be referred to as the second infrared wavelength region.

In other words, a region in the infrared wavelength region of the color filter (image-pickup element color filter) in which the transmittance for the red wavelength component is higher than the transmittances for the blue and green wavelength components will be referred to as the first infrared wavelength region, while a region in the infrared wavelength region of the color filter in which the difference between the transmittance for the red wavelength component and the transmittances for the blue and green wavelength components is smaller than that in the first infrared wavelength region will be referred to as the second infrared wavelength region.

The widths of the first and second infrared wavelength regions vary slightly depending on the spectral transmittance characteristics of the image-pickup element color filter. However, the infrared wavelength region in ordinary image-pickup element color filters can be roughly divided into a first infrared wavelength region in which a larger amount of the infrared wavelength component is transmitted and a second infrared wavelength region in which substantially equal amounts of the three color wavelength components are transmitted.

Single-wavelength light is radiated (for example, at intervals of 40 [nm] from 650 [nm]) to the image-pickup element to obtain a color-difference signal, such that the luminance signal output from the image-pickup element is constant in the first and second infrared wavelength regions of the primary-color and complementary-color filters.

Figure 4:
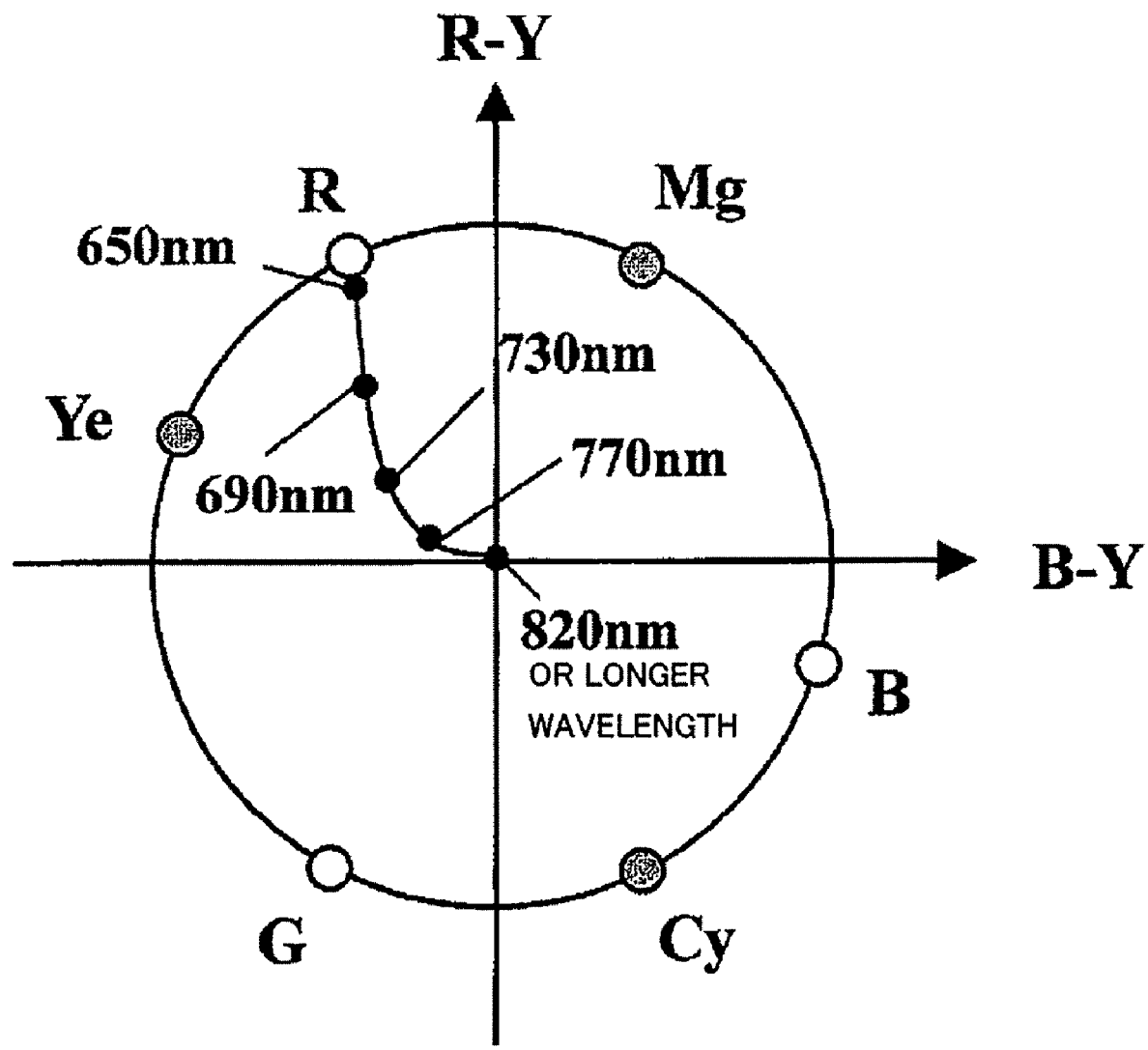
FIG. 4 is a distribution state diagram of color-difference signals with respect to wavelengths when the primary-color filter is irradiated with single-wavelength light of the infrared wavelength component.

FIG. 4 shows color-difference signals and an approximate line thereof for single-wavelength light in each of the first and second infrared wavelength regions of the primary-color filter in an orthogonal coordinate system having R-Y and B-Y axes of the color-difference signals.

Figure 5:
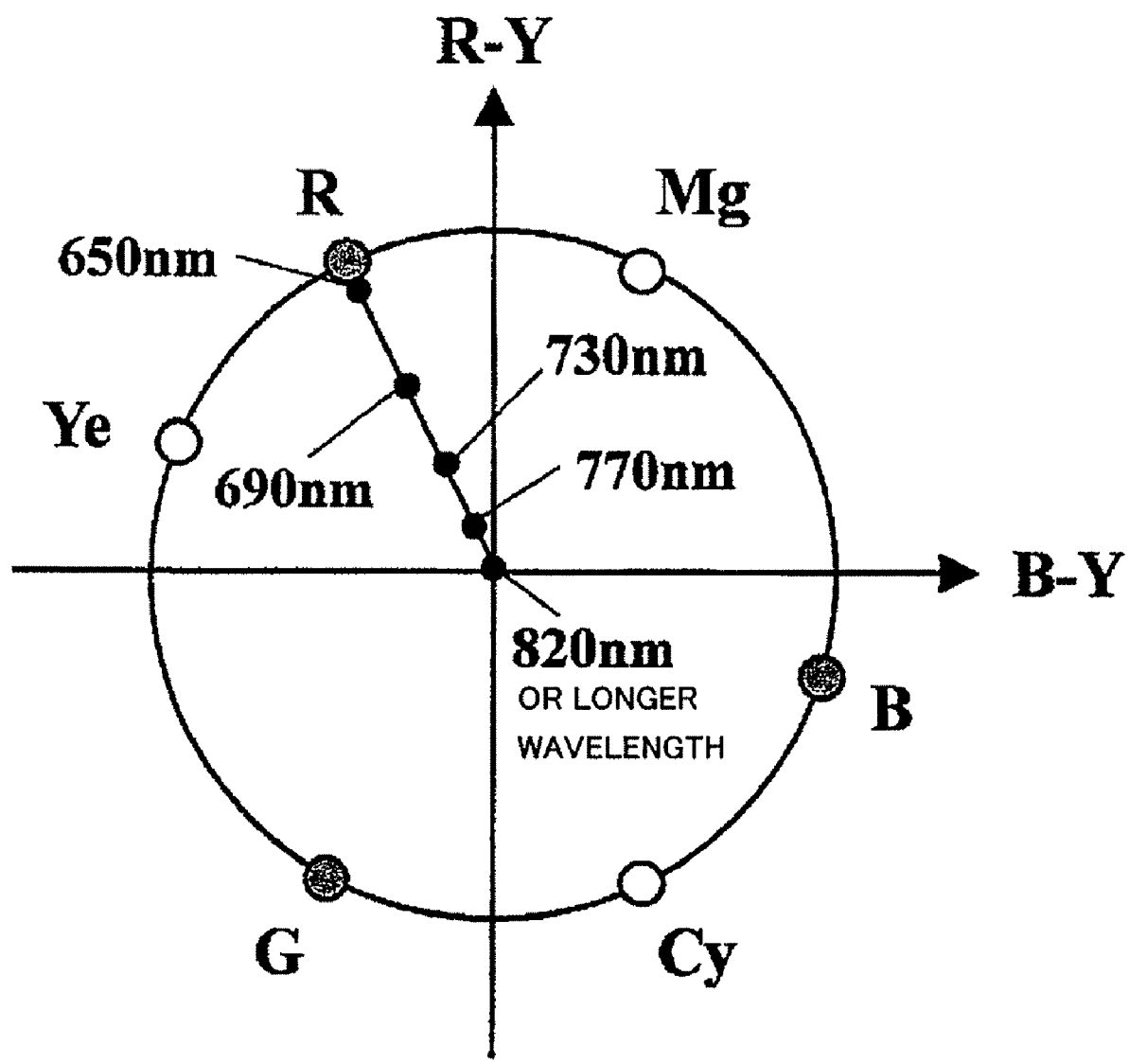
FIG. 5 is a distribution state diagram of color-difference signals with respect to wavelengths when the complementary-color filter is irradiated with single-wavelength light of the infrared wavelength component.

FIG. 5 shows color-difference signals and an approximate line thereof for single-wavelength light in each of the first and second infrared wavelength regions of the complementary-color filter.

The color-difference signals shown in FIGS. 4 and 5 in the wavelength region from about 650 [nm] to about 820 [nm] corresponding to the first infrared wavelength region are different in form from each other, but have such a characteristic as to be distributed on an approximate line extending from the red signal R to the coordinate center representing an achromatic color. This will be referred to as a definition line in the present invention and the embodiment thereof.

The color-difference signals in the wavelength region from 820 [nm] to a longer wavelength corresponding to the second infrared wavelength region have such a characteristic as to be distributed on the coordinate center representing an achromatic color. This point will be referred to as specified coordinates in the present invention and the embodiment thereof.

The definition line in the present invention and the embodiment thereof changes in form depending on the spectral transmittance characteristics of the primary-color or complementary-color filter which is used. There is, therefore, a need to obtain the definition line in advance by calculation from the spectral transmittance characteristics of the image-pickup element color filter which is used or by measurement.

Description will be made of a case where image pickup is performed under a light source such as a fluorescent lamp having substantially no infrared components, or image pickup is performed through the infrared cutting filter, that is, image pickup is performed with only the visible wavelength component.

Figure 6A:
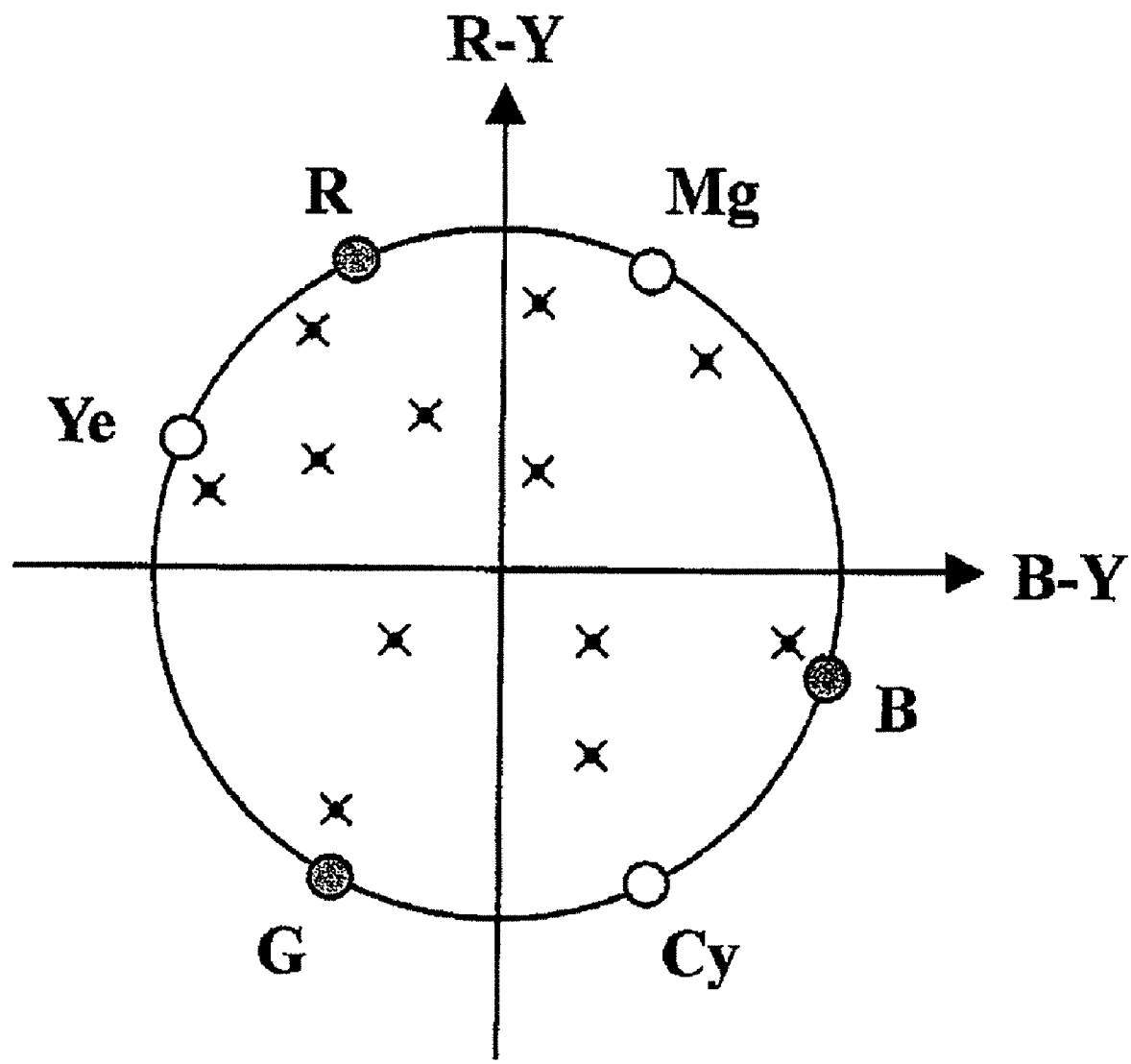
FIG. 6A is a distribution state diagram of color-difference signals extracted through the complementary-color filter when an object is irradiated with light from a light source having only a visible wavelength component.

It is assumed here that color-difference signals extracted by being averaged in a plurality of areas in the picked-up image in the case of image pickup with only the visible wavelength components have a distribution such as shown in FIG. 6A.

Figure 6B:
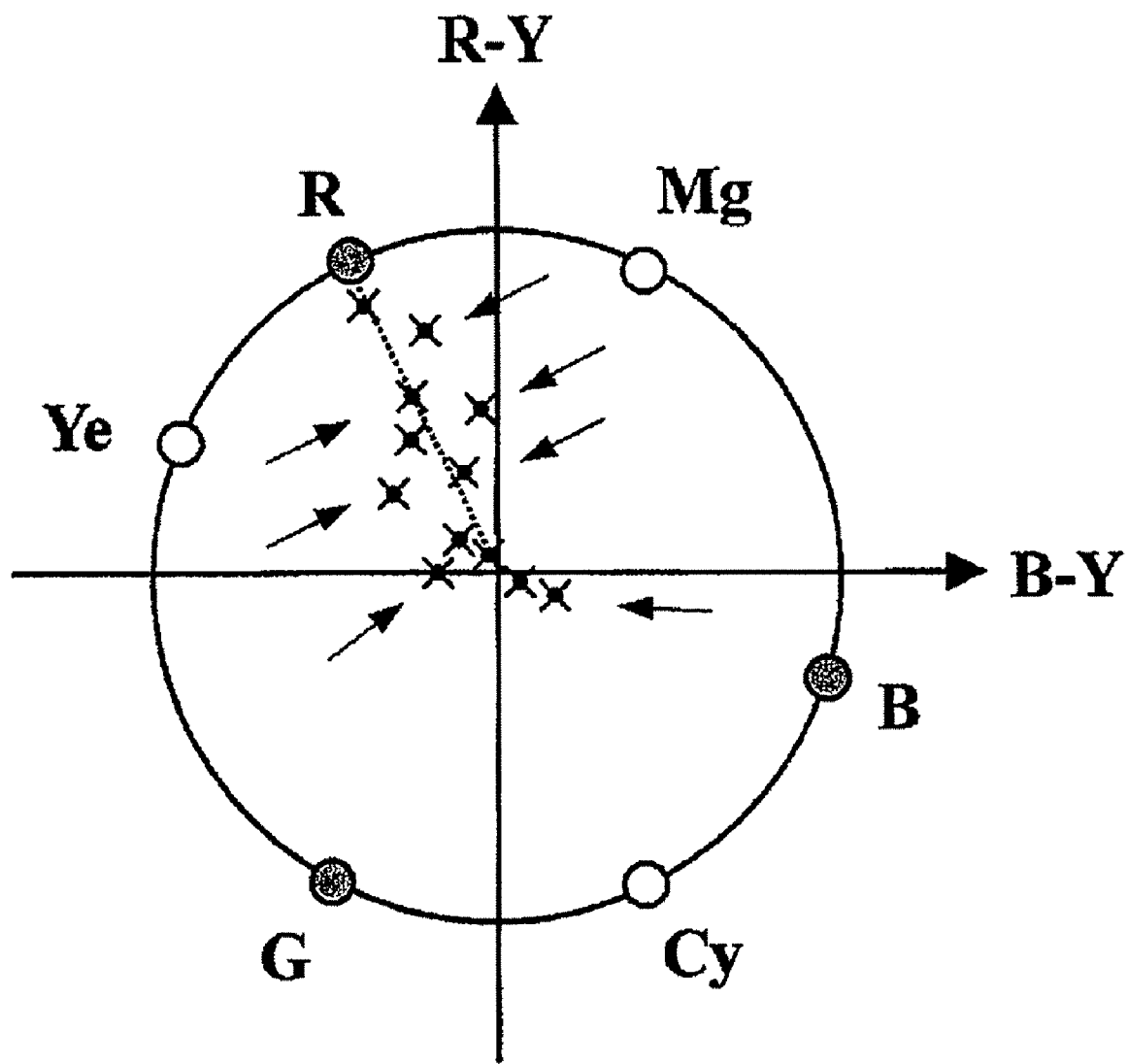
FIG. 6B is a distribution state diagram of color-difference signals extracted through the complementary-color filter when the object is irradiated with light from a mixed light source having the visible wavelength component and an infrared wavelength component A.

In a case where the wavelength component in the first infrared wavelength region is added to the visible wavelength component, the above-described extracted color-difference signals represent a mixed color as defined by the color-difference signals in the visible wavelength component and the color-difference signals in the first infrared wavelength region, i.e., the color-difference signals represented by the coordinates on the approximate line. In the case where the wavelength component in the first infrared wavelength region is added to the visible wavelength component, therefore, the distribution of the color-difference signals has such a characteristic as to be concentrated in the vicinity of the approximate line, as shown in FIG. 6B.

The degree of concentration in the vicinity of the approximate line depends on the ratio of the wavelength component in the first infrared wavelength region to the visible wavelength component and is increased if the amount of the wavelength component in the first infrared wavelength region is larger.

Figure 6C:
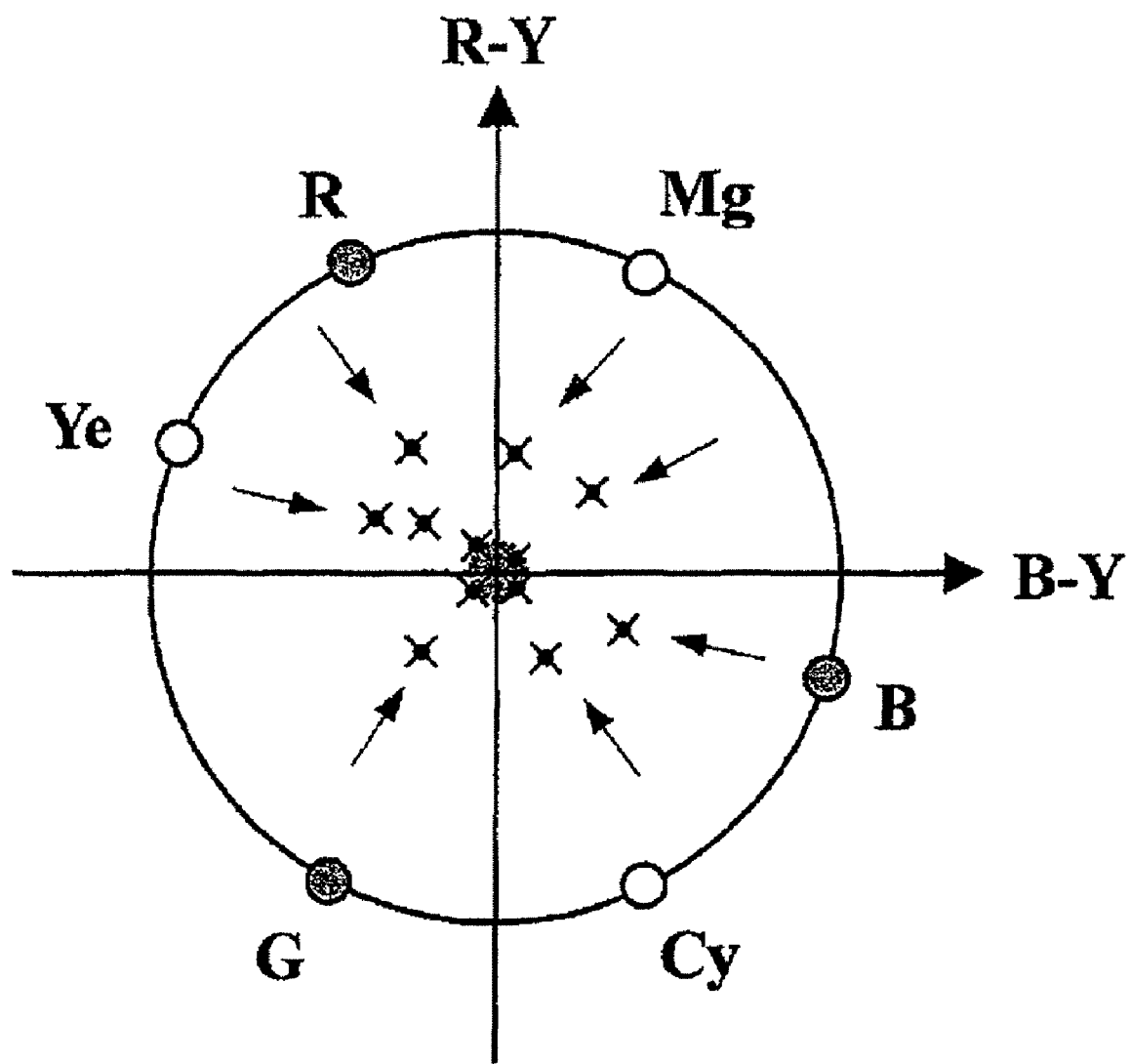
FIG. 6C is a distribution state diagram of color-difference signals extracted through the complementary-color filter when the object is irradiated with light from the mixed light source having the visible wavelength component and an infrared wavelength component B.

In a case where the wavelength component in the second infrared wavelength region is added to the visible wavelength component, the above-described extracted color-difference signals represent a mixed color as defined by the color-difference signal in the visible wavelength component and the color-difference signal in the second infrared wavelength region, i.e., the achromatic color-difference signal represented by the specified coordinates. In the case where the wavelength component in the second infrared wavelength region is added to the visible wavelength component, therefore, the distribution of the color-difference signals has such a characteristic as to be concentrated in the vicinity of the specified coordinates, as shown in FIG. 6C.

The degree of concentration in the vicinity of the specified coordinates depends on the ratio of the wavelength component in the second infrared wavelength region to the visible wavelength component and is increased if the amount of the wavelength component in the second infrared wavelength region is larger.

The characteristics of the wavelength components in the first and second infrared wavelength regions influential on the color-difference signals extracted from the plurality of areas in the picked-up image are utilized. The degrees of concentration of the extracted color-difference signals in the vicinity of the definition line and the specified coordinates are evaluated on the basis of the positional relationship in the orthogonal coordinate system formed by the R-Y and B-Y axes of the color-difference signal.

Each of the proportion of the wavelength component in the first infrared wavelength region and the proportion of the wavelength component in the second infrared wavelength region, which are included in the light source, can be detected through this evaluation.

As a method of quantitatively evaluating the degree of concentration of the above-described extracted color-difference signals in the vicinity of the definition line, calculation of the dispersion value of the shortest distance between each color-difference signal and the definition line is performed. Further, the total of the calculated dispersion values is used as an evaluation value.

Figure 8A:
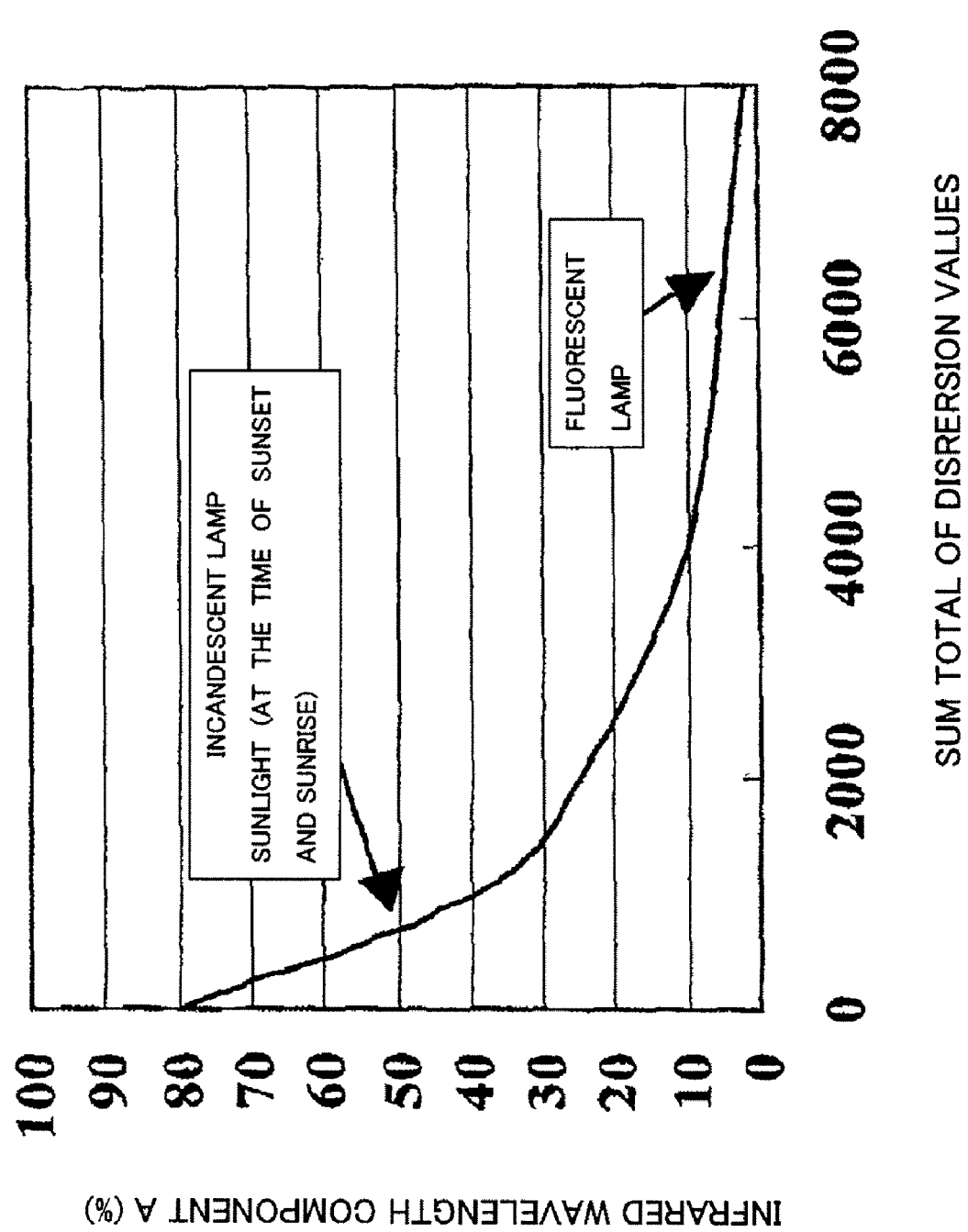
FIG. 8A is a diagram showing the relationship between the total of values representing dispersion with respect to a definition line and the proportion of the wavelength component in the first infrared wavelength region of the complementary color filter for an ordinary object.

The total of the calculated dispersion values with respect to the definition line and the proportion of the wavelength component in the first infrared wavelength region (infrared wavelength component A) have a relationship such as shown in FIG. 8A for an ordinary object. If data on the relationship is stored in a storage means in advance, the proportion of the wavelength component in the first infrared wavelength region can be determined on the basis of the total of the calculated dispersion values with respect to the definition line and the stored data.

As a method of quantitatively evaluating the degree of concentration of the above-described extracted color-difference signals in the vicinity of the specified coordinates, calculation of the dispersion value of the shortest distance between the respective extracted color-difference signal and the specified coordinates is performed. Further, the total of the calculated dispersion values is used as an evaluation value.

Figure 8B:
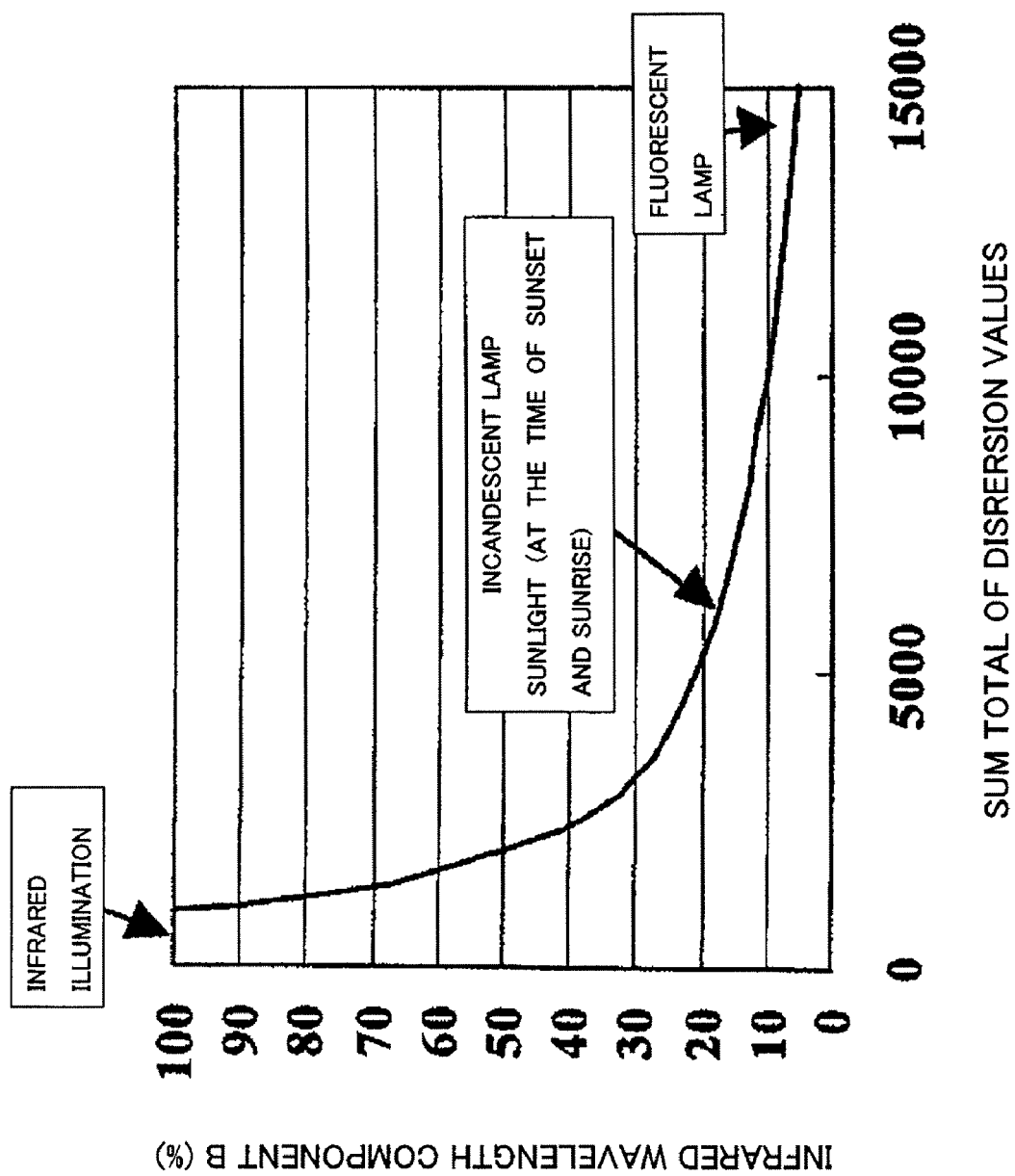
FIG. 8B is a diagram showing the relationship between the total of values representing dispersion with respect to specified coordinates and the proportion of the wavelength component in the second infrared wavelength region of the complementary color filter for an ordinary object.

The total of the calculated dispersion values with respect to the specified coordinates and the proportion of the wavelength component in the second infrared wavelength region (infrared wavelength component B) have a relationship such as shown in FIG. 8B for an ordinary object. If data on the relationship is stored in a storage means in advance, the proportion of the wavelength component in the second infrared wavelength region can be determined on the basis of the total of the calculated dispersion values with respect to the specified coordinates and the stored data.

Evaluation as to how the above-described respective extracted color-difference signals are distributed can be made by calculating the dispersion values of the shortest distances between the respective extracted color-difference signals and the definition line and the dispersion values of the shortest distances between the respective extracted color-difference signals and the specified coordinates and by totalizing the dispersion values.

Figure 7:
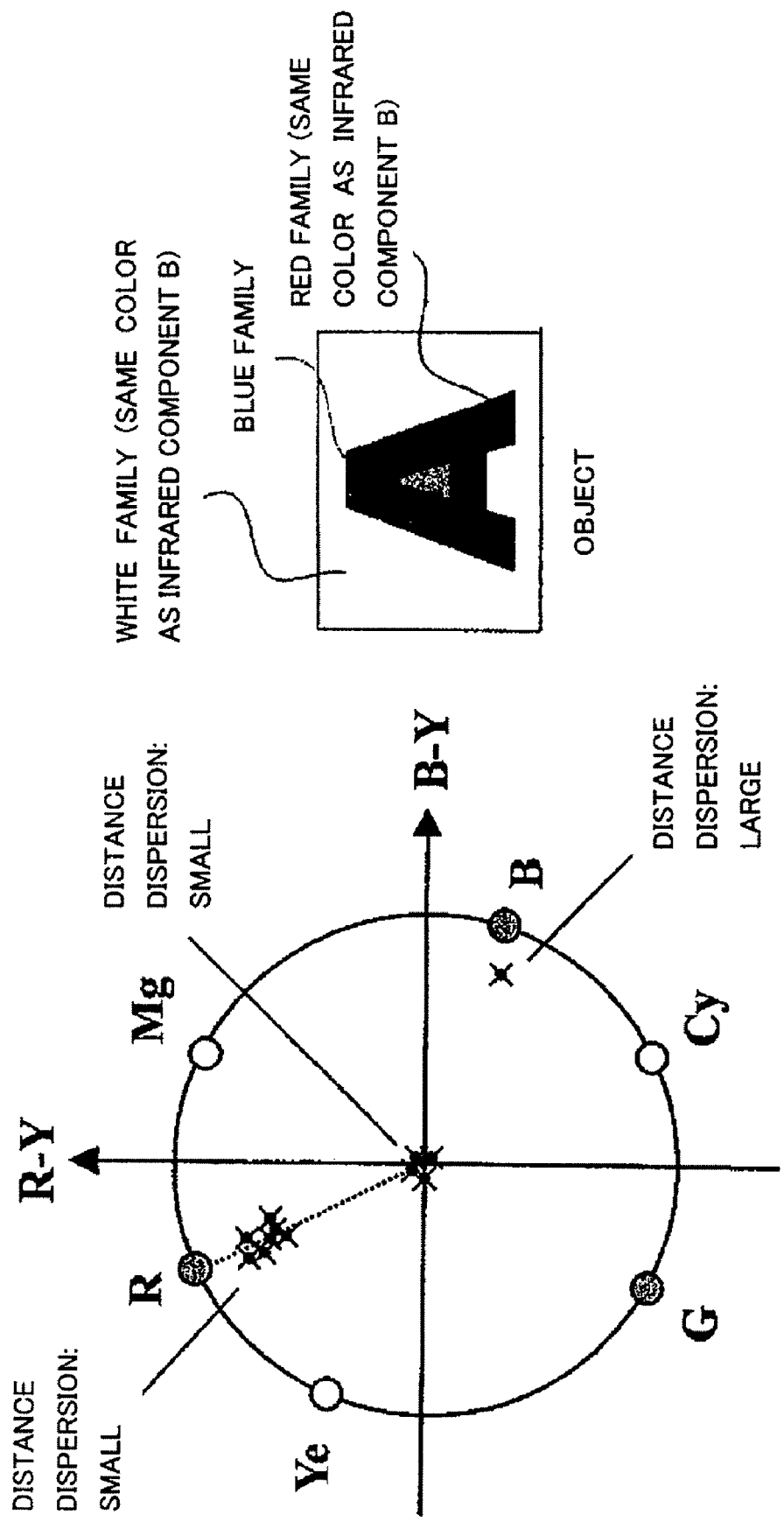
FIG. 7 is a diagram showing the relationship between the distribution of color-difference signals and distance dispersions in a case where a color in an object is biased to a color close to a color represented by the wavelength components in first and second infrared wavelength regions.

For example, a case will be considered in which the majority of colors of an object shown in FIG. 7 are approximate to colors in the first infrared wavelength region (in the vicinity of the definition line) and colors in the second infrared wavelength region (in the vicinity of the specified coordinates).

The areas in which the colors approximate to the first and second infrared wavelength regions are distributed are in the vicinity of the definition line and the specified coordinates, and the dispersion values of the shortest distances are small. However, if at least one of the distributions in the plurality of areas in the picked-up image is away from the definition line and the specified coordinates, the dispersion value of the shortest distance is increased.

Therefore the total of all the dispersion values in this case is increased relative to the total of the dispersion values in image pickup under a light source in which the wavelength components in the first and second infrared wavelength regions are mixed. Accordingly, there is no possibility of a considerably large error in determination of the proportions of the first and second infrared wavelength components (A, B) even in a case where the color-difference signals are biased to the vicinity of the definition line and the specified coordinates as shown in FIG. 7.

Embodiment 1

A wavelength proportion detection apparatus that is Embodiment 1 of the present invention will be described with reference to FIG. 9. A camera having an infrared cutting filter changing function will also be described as an image-pickup apparatus that is an embodiment of the present invention incorporating the wavelength proportion detection apparatus of Embodiment 1 with reference to FIG. 10.

Figure 10:
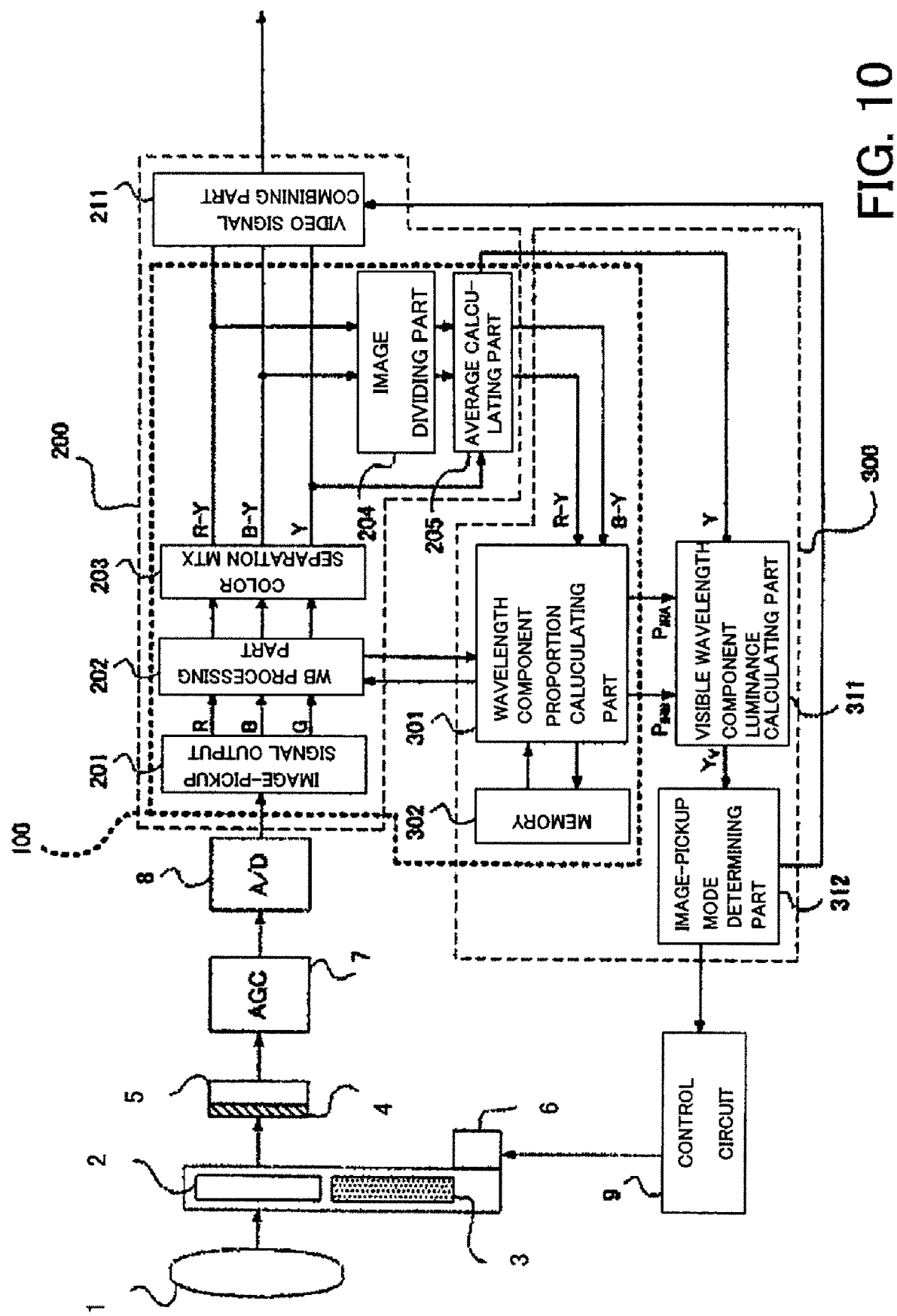
FIG. 10 is a diagram showing the configuration of a camera having an infrared cutting filter changing function, which is an image-pickup apparatus as an embodiment of the present invention that uses the wavelength proportion detection apparatus of Embodiment 1.

In the image-pickup optical system 1 shown in FIG. 10, reflected light from an object passes through an optical-path-length correcting filter 2 and then enters an image-pickup element 5 via an image-pickup element color filter 4.

An analog image-pickup signal from the image-pickup element 5 is amplified by an amplifier 7 and converted into a digital image-pickup signal by an A/D converter 8.

An image-pickup signal output 201 is obtained by separating the image-pickup signal from the A/D converter 8 into a red signal R, a blue signal B and a green signal G.

A WB processing part 202 is a part for adjusting the R gain and B gain of the image pickup signal to achieve suitable white balance.

A color separation matrix (MTX) 203 is a processing part for converting the red signal R, the blue signal B and the green signal G adjusted to achieve suitable white balance into color-difference signals R-Y and B-Y and a luminance signal Y.

The color-difference signals R-Y and B-Y and the luminance signal Y are combined into a video signal by a video signal combining part 211 to be output to outside.

When an infrared cutting filter 3 is removed and when the optical-path-length correcting filter 2 is inserted, the color balance of the video signal is lost due to mixing of infrared light.

In image pickup in the state where the optical-path-length correcting filter 2 is inserted, therefore, the video signal combining part 211 ordinarily outputs a black-and-white image based only on the luminance signal Y while discarding the color-difference signals R-Y and B-Y obtained from the color separation matrix 203.

The wavelength proportion detection apparatus 100 of Embodiment 1 is an apparatus for detecting the proportions of wavelength components by using the color-difference signals R-Y and B-Y obtained in the video signal processing circuit 200 shown in FIG. 10. Also, processing for detecting the proportions of wavelength components is a portion of calculation processing in a video signal processing circuit 200 and a microcomputer 300.

Figure 9:
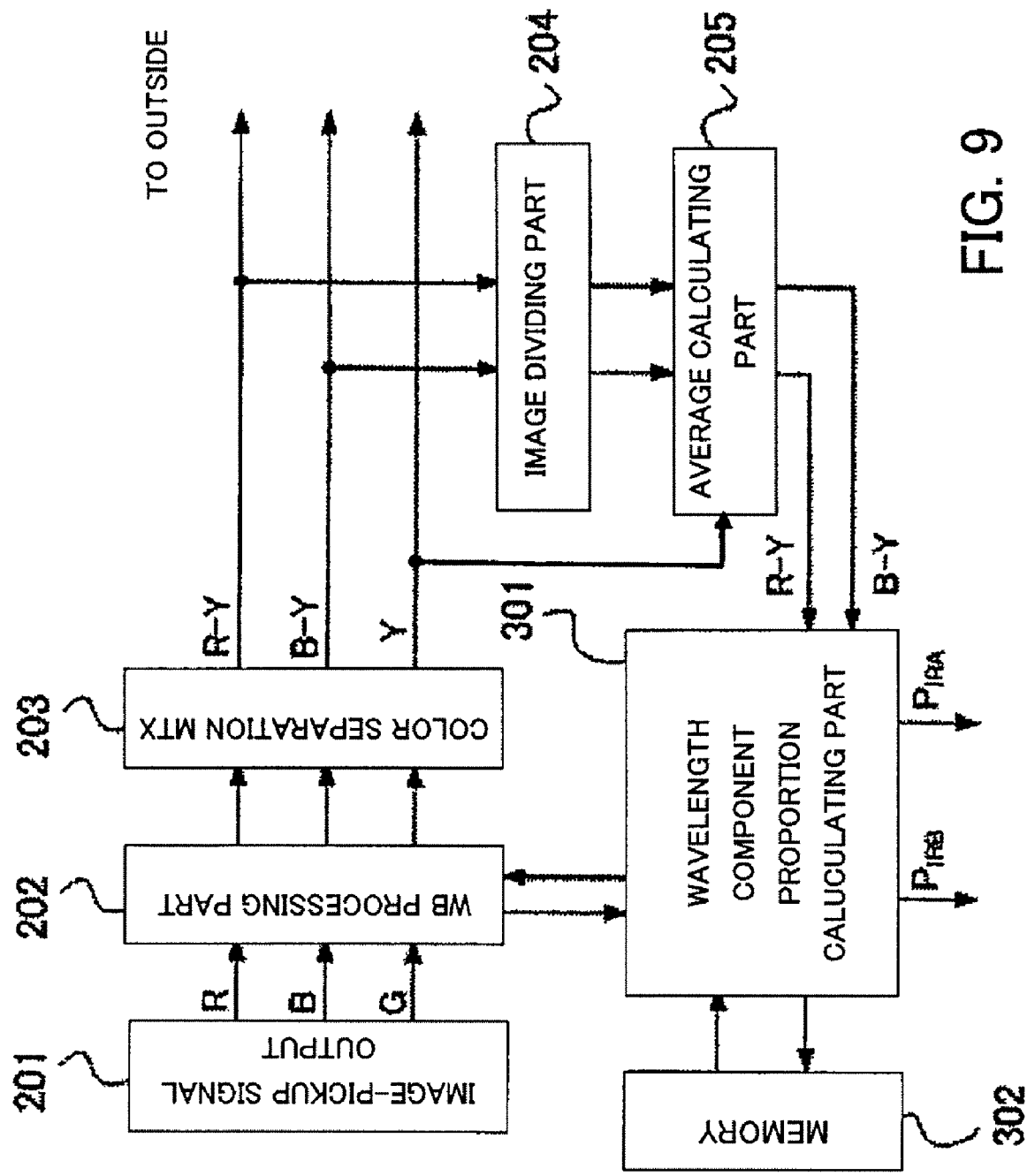
FIG. 9 is a diagram showing a partial configuration of the wavelength proportion detection apparatus that is Embodiment 1 of the present invention.

The image-pickup signal output 201 in the wavelength proportion detection apparatus shown in FIG. 9 is an image-pickup signal output obtained by the image-pickup element picking up an image formed of light with wavelengths from a visible wavelength region to an infrared wavelength region through the image-pickup optical system and the image-pickup element color filter.

In the camera having the infrared cutting filter changing function and arranged as shown in FIG. 10, the image-pickup signal output 201 in the wavelength proportion detection apparatus shown in FIG. 9 is an image-pickup signal output obtained by performing image pickup in the state where the optical-path-length correcting filter 2 is inserted.

The WB processing part 202 adjusts the R gain and B gain of the image pickup signal to achieve suitable white balance.

However, the video signal in which light in the infrared wavelength region is mixed loses the color balance. Therefore the R gain and B gain may be adjusted as fixed values.

The color separation matrix 203 converts the red signal R, blue signal B and green signal G into the color-difference signals R-Y and B-Y and luminance signal Y.

The color-difference signals R-Y and B-Y of the converted signals are input to an image dividing part 204.

The image dividing part 204 is a part for dividing the color-difference signals in the picked-up image into a plurality of areas. An average calculating part 205 averages the color-difference signals in each of the plurality of divided areas.

If the number by which the picked-up image is divided in the image dividing part 204 is increased to segmentalize the image more finely, the extraction accuracy of the color-difference signals is increased.

Figure 11:
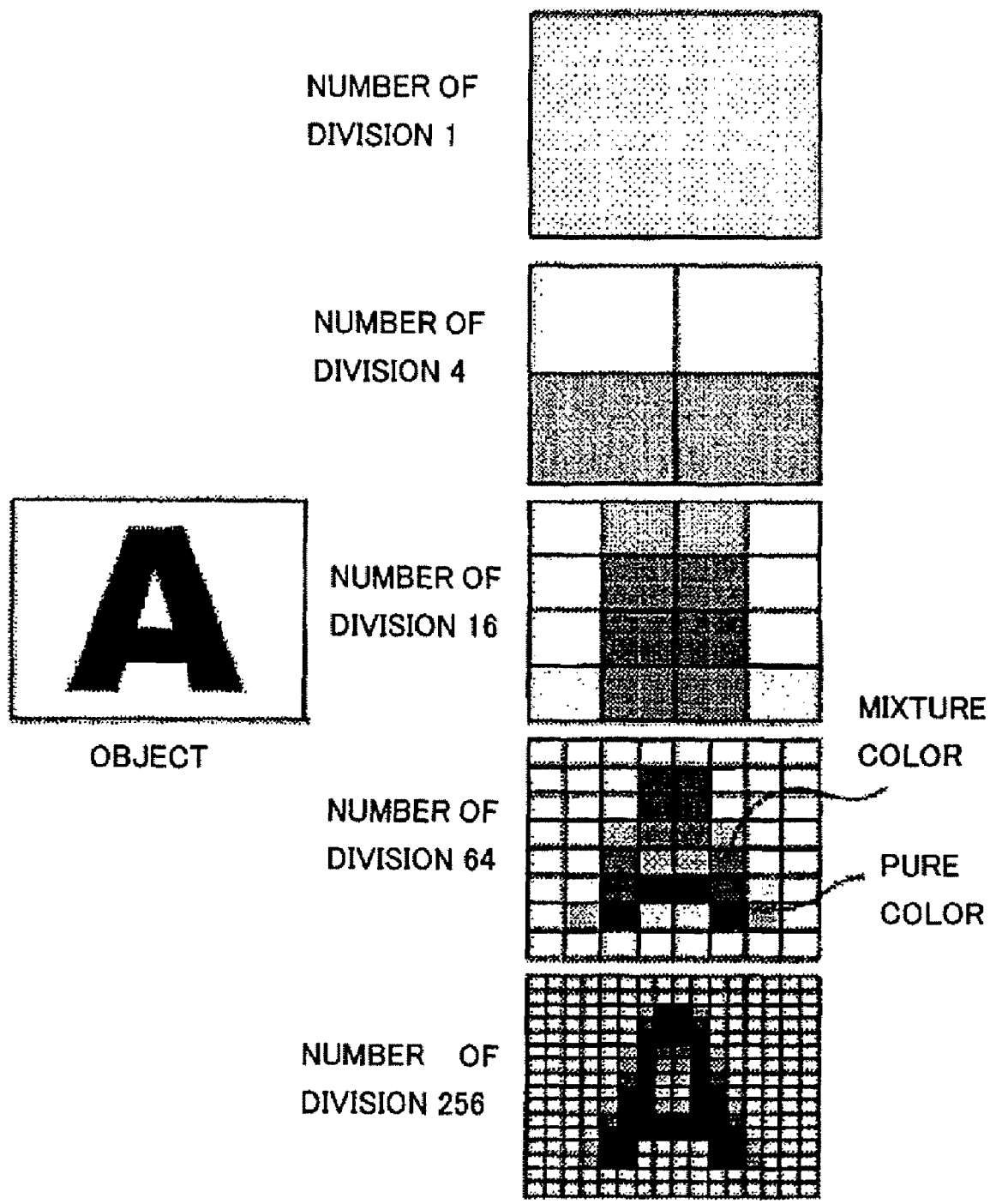
FIG. 11 is a diagram for explaining the accuracy of extraction of color-difference signals by the wavelength proportion detection apparatus of Embodiment 1 with respect to the number by which the picked-up image is divided.

FIG. 11 shows changes of extracted colors in the divided areas with the increase in the number by which the image is divided. When the number by which the image is divided is small, an extracted color becomes a mixed color of a color of the object and a color of the background.

As the number by which the image is divided is increased, the separation between colors of the object and colors of the background becomes definite. When the number by which the image is divided is sufficiently large, the colors of the object and the colors of the background can be extracted as pure colors or mixed colors close to the pure colors.

It is, therefore, desirable to extract the color-difference signals by increasing the number by which the picked-up image is divided to segmentalize it as finely as possible in order to increase the probability of success in accurately extracting the colors of the object in the picked-up image.

The color-difference signals R-Y and B-Y averaged and extracted by the image dividing part 204 and the average calculating part 205 are input to a wavelength component proportion calculating part 301.

The wavelength component proportion calculating part 301 determines the proportions of the wavelength components by referring to the input color-difference signals R-Y and B-Y, white balancing adjustment values in the WB processing part 202 and data stored in a memory 302.

Figure 12:
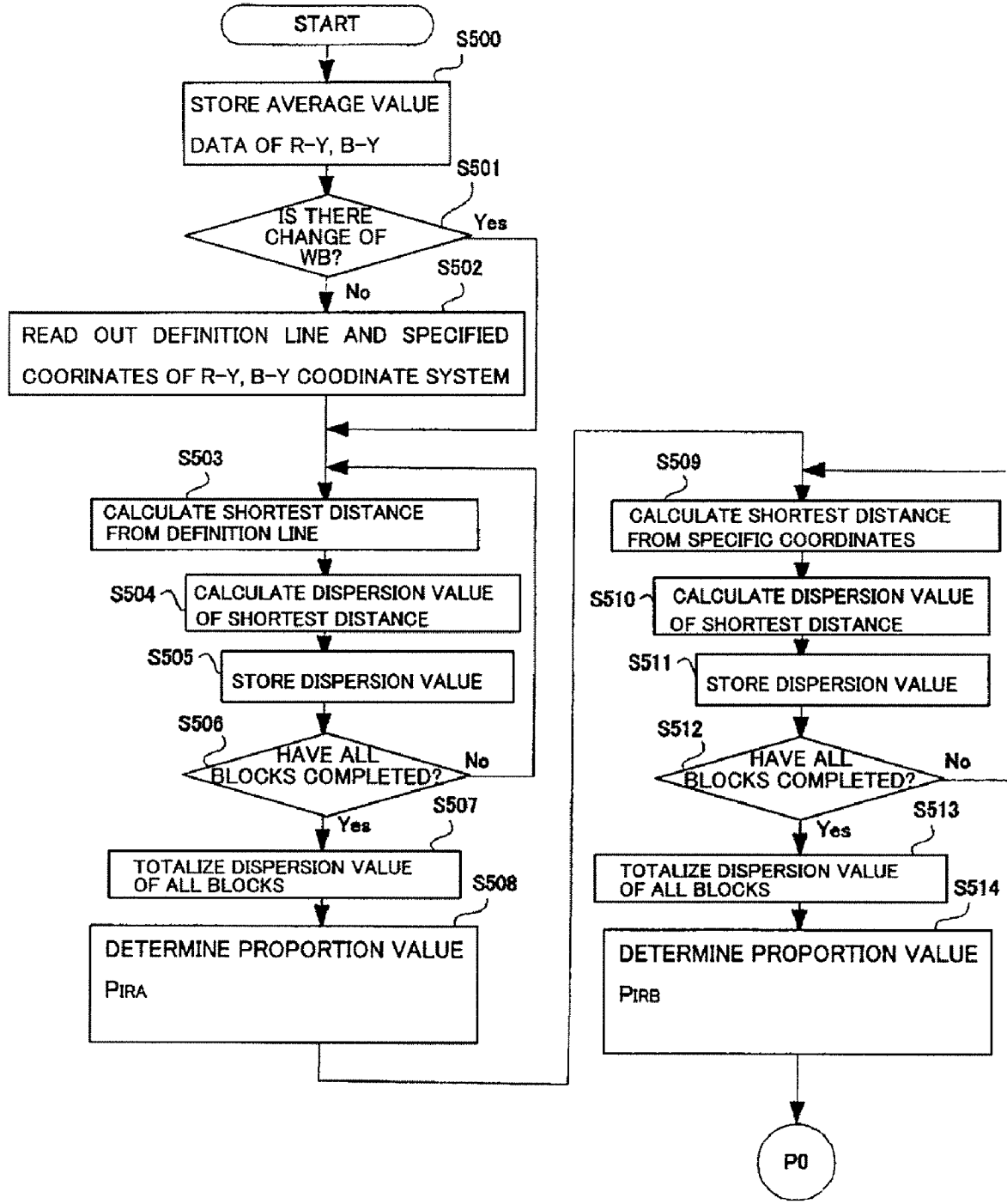
FIG. 12 is a flowchart of processing in a wavelength component proportion calculating part in the wavelength proportion detection apparatus of Embodiment 1.

FIG. 12 shows concrete processing in the wavelength component proportion calculating part 301. In step S500, the color-difference signals (average values) R-Y and B-Y obtained by the average calculating part 204 from each area divided by the image dividing part 204 are stored.

In step S501, the white balancing adjustment value in the WB processing part 202 is read out and a check is made as to whether or not any change in the value has been made after preceding processing.

The values of the color-difference signals R-Y and B-Y vary depending on the white balancing adjustment value. Therefore, if a change in the white balancing value is recognized in step S501, a need arises for processing in step 502.

That is, there is a need for processing in step S502 for rereading from the memory 302 the definition line and the specified coordinates of the orthogonal coordinate system formed by the R-Y and B-Y axes, which correspond to the present white balancing adjustment value.

If the color-difference signals R-Y and B-Y have been extracted from the same picked-up image or if the white balancing adjustment value is the same as that for the picked-up image in the preceding processing, no change is made in the white balancing adjustment value and, therefore, processing in step S502 is not performed.

Also in a case where the white balancing adjustment value is fixed at all times in the WB processing part 202, processing in step S502 is not performed.

In step S503, the shortest distances between the color-difference signals R-Y and B-Y and the definition line are calculated.

In step S504, the dispersion value of the shortest distances is calculated. In step S505, the dispersion value is stored.

In step S506, a check is made as to whether or not processing from step S503 to step S505 has been completed with respect to all the areas divided from the picked-up image.

If the processing has not been completed with respect to all the areas, the processing from step S503 to step S505 is repeated.

If the processing has been completed with respect to all the areas, the process advances to step S507 and processing for obtaining the sum total of the dispersion values stored in step S505 is performed.

In step S508, the proportion $P_{IRA}$ of an infrared wavelength component A that is a component in the first infrared wavelength region is determined by collating the sum total of the dispersion values calculated in step S507 and the correlation data between the sum total of the dispersion values and the proportion of the infrared wavelength component A (see FIG. 8A) stored in the memory 302 in advance.

In step S509, the shortest distances between the color-difference signals R-Y and B-Y and the specified coordinates are calculated.

In step S510, the dispersion value of the shortest distances is calculated. In step S511, the dispersion value is stored.

In step S512, a check is made as to whether or not processing from step S509 to step S511 has been completed with respect to all the areas divided from the picked-up image.

If the processing has not been completed with respect to all the areas, the processing from step S509 to step S511 is repeated.

If the processing has been completed with respect to all the areas, the process advances to step S513 and processing for obtaining the sum total of the dispersion values stored in step S511 is performed.

In step S514, the proportion PIRB of an infrared wavelength component B that is a component in the second infrared wavelength region is determined by collating the sum total of the dispersion values calculated in step S513 and the correlation data between the sum total of the dispersion values and the proportion of the infrared wavelength component B (see FIG. 8B) stored in the memory 302 in advance.

Either of the processing from step S503 to step S508 for determining the proportion $P_{IRA}$ of the infrared wavelength component A and the processing from step S509 to step S514 for determining the proportion $P_{IRB}$ of the infrared wavelength component B may be performed before the other.

The proportion $P_{IRA}$ of the wavelength component A in the first infrared wavelength region and the proportion $P_{IRB}$ of the wavelength component B in the second infrared wavelength region calculated in processing performed by the wavelength component proportion detection apparatus 100 shown in FIG. 10 are input to a visible wavelength component luminance calculating part 311.

The visible wavelength component luminance calculating part 311 calculates the luminance of the visible wavelength component included in the light source, as described below.

That is, the luminance of the visible wavelength component in the light source is calculated by using the proportion $P_{IRA}$ of the wavelength component in the first infrared wavelength region, the proportion $P_{IRB}$ of the wavelength component in the second infrared wavelength region, and the average luminance Y of the entire picked-up image which is obtained from the average calculating part 205.

The calculated luminance $Y_V$ of the visible wavelength component is input to an image pickup mode determining part 312.

The image pickup mode determining part 312 compares the input luminance $Y_V$ of the visible wavelength component and an image pickup mode switching threshold value $Y_D$ set in advance to determine whether or not the image pickup mode should be changed.

Processing performed in the visible wavelength component luminance calculating part 311 and the image pickup mode determining part 312 is a portion of the calculation processing in the microcomputer 300, which is performed after processing in the wavelength component proportion calculating part 301 (see FIG. 12).

Processing performed in the visible wavelength component luminance calculating part 311 and the image pickup mode determining part 312 will be described with reference to FIG. 13.

In step S580, $1-(P_{IRA}+P_{IRB})$ is calculated from the values of the proportion $P_{IRA}$ of the wavelength component in the first infrared wavelength region and the proportion $P_{IRB}$ of the wavelength component in the second infrared wavelength region.

The proportion of the wavelength component included in the light source other than the wavelength components in the first and second infrared wavelength regions, i.e., the visible wavelength component, is calculated thereby.

In step S581, the average luminance Y of the entire picked-up image is obtained from the average calculating part 205.

In step S582, the luminance $Y_V$ of the visible wavelength component included in the light source is calculated by multiplying the obtained average luminance Y by the proportion of the visible wavelength component calculated in step S580. The calculated luminance $Y_V$ of the visible wavelength component is input to the image pickup mode determining part 312.

In step S583, comparison is made between the image pickup mode switching threshold value $Y_D$ set in advance and the luminance $Y_V$ of the visible wavelength component.

If the luminance $Y_V$ of the visible wavelength component is higher than the image pickup mode switching threshold value $Y_D$, it is determined that the image pickup mode should be changed. When this determination is made, a filter change signal is output to a control circuit 9 in step S584.

In step S585 after step S584, a signal is also output to the video signal combining part 211 to cause this part to stop discarding the color-difference signals R-Y and B-Y and to perform color video signal combining processing.

The control circuit 9 receives the signal from the image pickup mode determining part 312 and sends a filter drive signal to a filter drive motor 6.

The video signal combining part 211 receives the signal from the image pickup mode determining part 312, stops discarding the color-difference signals R-Y and B-Y and outputs a color video signal by combining the color-difference signals R-Y and B-Y and the luminance signal Y.

The above-described configuration ensures that the luminance $Y_V$ of the visible wavelength component in the light source can be detected, and that the image pickup mode can be determined on the basis of the luminance $Y_V$ of the visible wavelength component and the image pickup mode switching threshold value $Y_D$ set in advance.

As a result, the luminance on a color picked-up image after insertion of the infrared cutting filter that was removed can be stabilized at a value in the vicinity of the image pickup mode switching threshold value $Y_D$, regardless of the amount of the infrared wavelength component in the light source.

Embodiment 2

Embodiment 2 of the present invention adapted to wavelength component proportion detection in image pickup under a low luminance condition in the wavelength component proportion detection apparatus of the present invention will be described.

When the luminance signal Y decreases in image pickup under a low luminance condition, the color-difference signals R-Y and B-Y obtained from the image pick-up element also decrease correspondingly.

Figure 14:
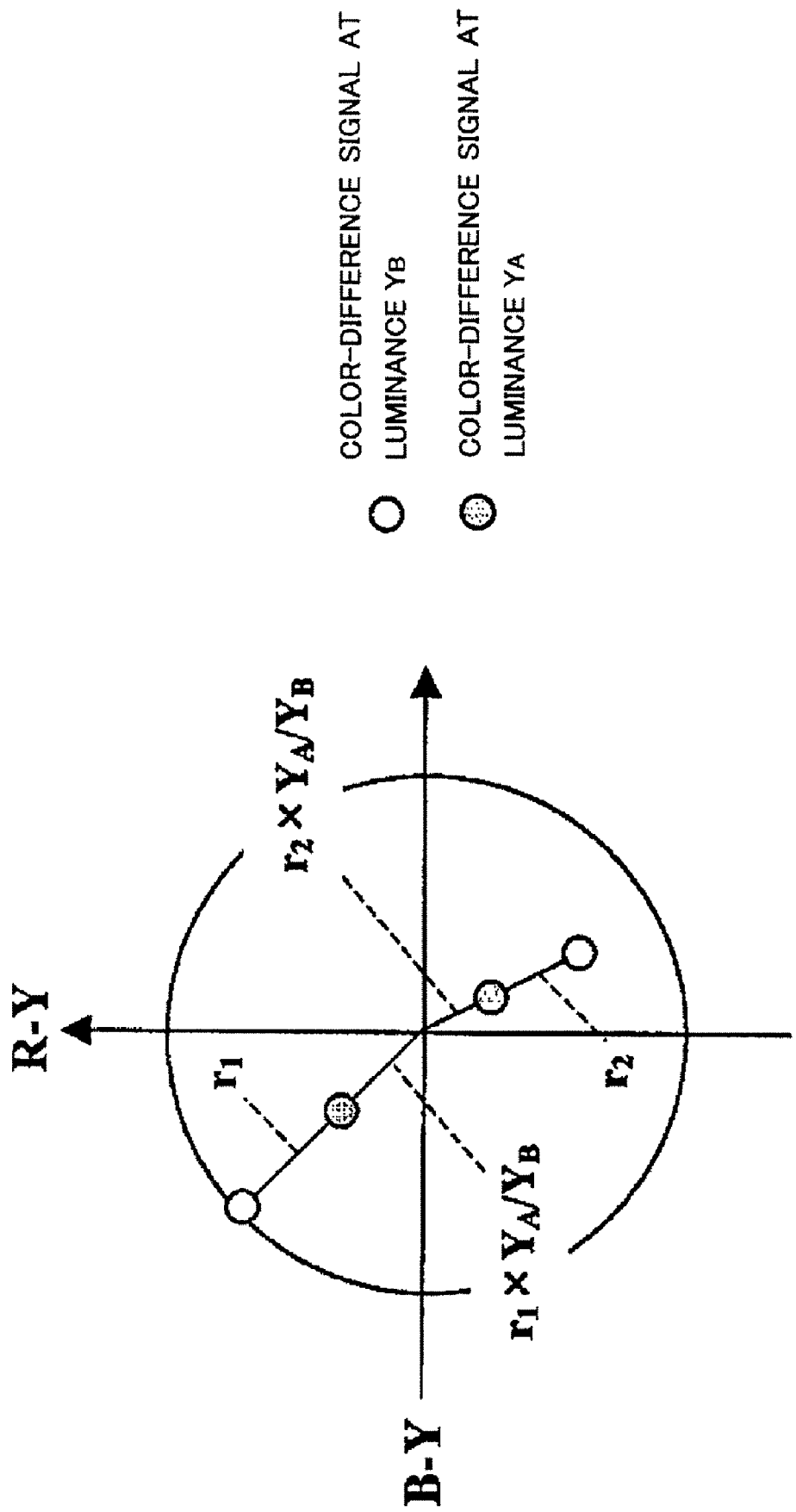
FIG. 14 is a diagram showing the relationship between the luminance signal and the color-difference signal at a low luminance.

FIG. 14 shows the difference between the distributions of the color-difference signals R-Y and B-Y obtained by picking up one color at low luminances YA and $Y_B$.

It is assumed that low luminances $Y_A$ and $Y_B$ have a relationship: $Y_A<Y_B$, and that in image pickup at low luminance $Y_B$ the distances between the color-difference signals of a certain color and the center of the orthogonal coordinate system formed by R-Y and B-Y axes are r1 and r2.

In image pickup at low luminance $Y_A$, the distances between the color-difference signals and the center of the orthogonal coordinate system formed by R-Y and B-Y axes are approximately expressed by $r1 \times Y_A/Y_B$ and $r2 \times Y_A/Y_B$.

R-Y/Y and B-Y/Y, which are the ratios of the color-difference signal to the luminance signal are calculated at low luminances $Y_A$ and $Y_B$, and the distances from the center of the orthogonal coordinate system formed by R-Y/Y axis and B-Y/Y axis are calculated. Along with these values, the values of $r1/Y_B$ and $r2/Y_B$ can be obtained.

In image pickup at a low luminance, therefore, R-Y/Y and B-Y/Y, which are the ratios of the color-difference signal to the luminance signal, are used as evaluation values to enable color information evaluation regardless of the value of the luminance signal Y.

A definition line and specified coordinates in the orthogonal coordinate system formed by R-Y/Y and B-Y/Y axes representing the ratios of the color-difference signal to the luminance signal will be described.

Single-wavelength light is radiated (for example, at intervals of 40 [nm] from 650 [nm]) to the image-pickup element so that the luminance signal output from the image-pickup element is constant in the first and second infrared wavelength regions of the primary-color and complementary-color filters.

The resulting color-difference signals obtained by this radiation are as shown in FIGS. 4 and 5. Thus, even if the orthogonal coordinate system formed by R-Y/Y and B-Y/Y axes representing the ratios of the color-difference signal to the luminance signal is used in place of the orthogonal coordinate system formed by R-Y and B-Y axes, the definition line and specified coordinates are formed in the same manner in the primary-color and complementary-color filters, as shown in FIGS. 15A and 15B.

The proportions of wavelength components can be detected in the same manner as in the case of the orthogonal coordinate system formed by R-Y and B-Y axes representing the color-difference signals, as described below.

That is, the concentration degree of the distributions of the ratios of the color-difference signals averaged and extracted from a plurality of areas to the luminance signal in the vicinity of the definition line and specified coordinates in the orthogonal coordinate system formed by the above-described R-Y/Y and B-Y/Y axes are evaluated on the basis of the positional relationship with the definition line and specified coordinates. The proportions of wavelength components can be detected through this evaluation.

Figure 16:
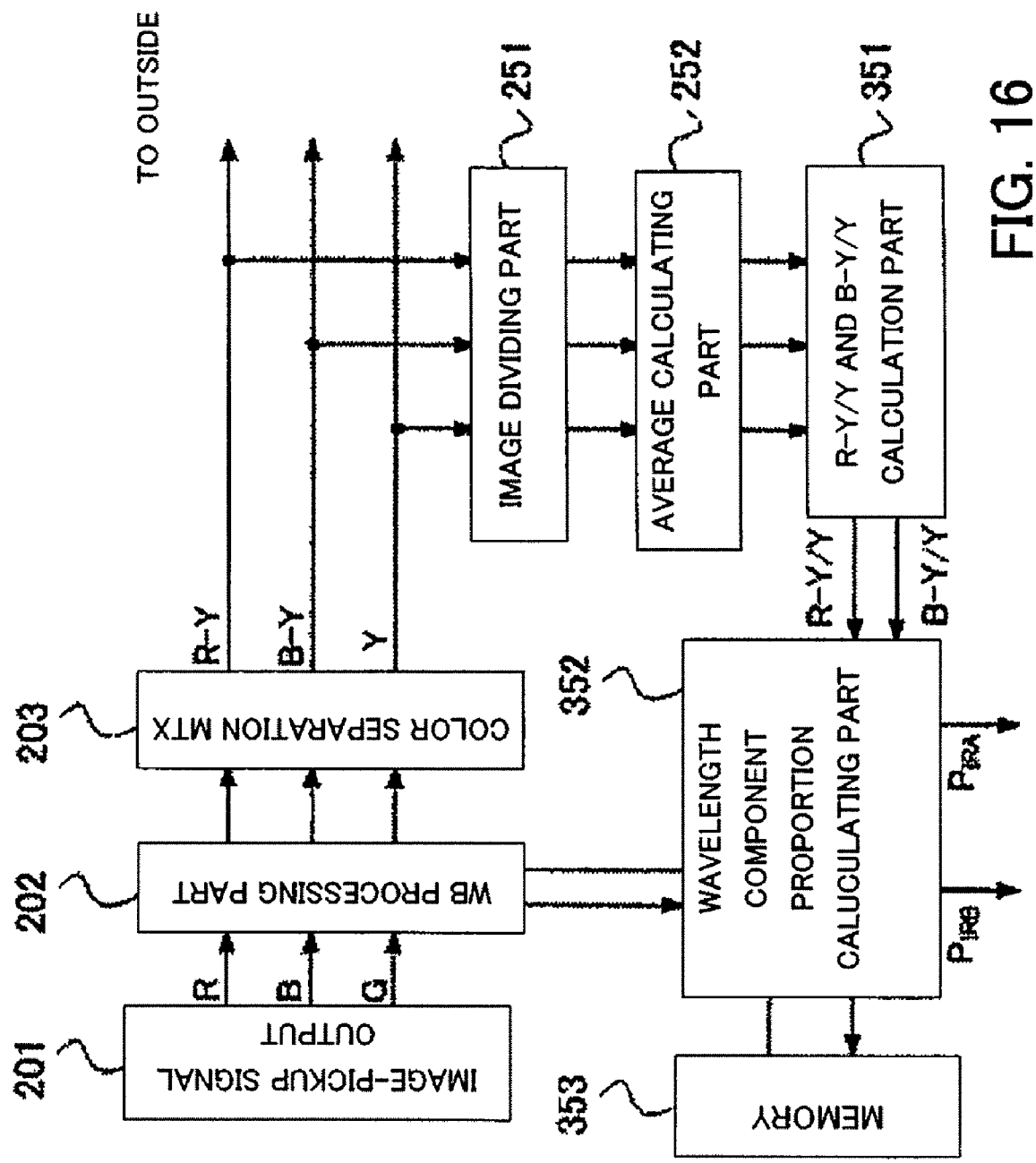
FIG. 16 is a diagram for explaining a wavelength proportion detection apparatus in an embodiment adapted to image pickup under a low-luminance condition.

Therefore, a configuration adapted to wavelength component proportion detection in image pickup under a low luminance condition as shown in FIG. 16 can also be employed.

In the configuration shown in FIG. 16, the proportions of wavelength components are detected by using the orthogonal coordinate system formed by R-Y/Y and B-Y/Y axes representing the ratios of the color-difference signal to the luminance signal.

A camera of this embodiment having an infrared cutting filter changing function and incorporating the wavelength component proportion detection apparatus shown in FIG. 16 will be described with reference to FIG. 17.

Figure 17:
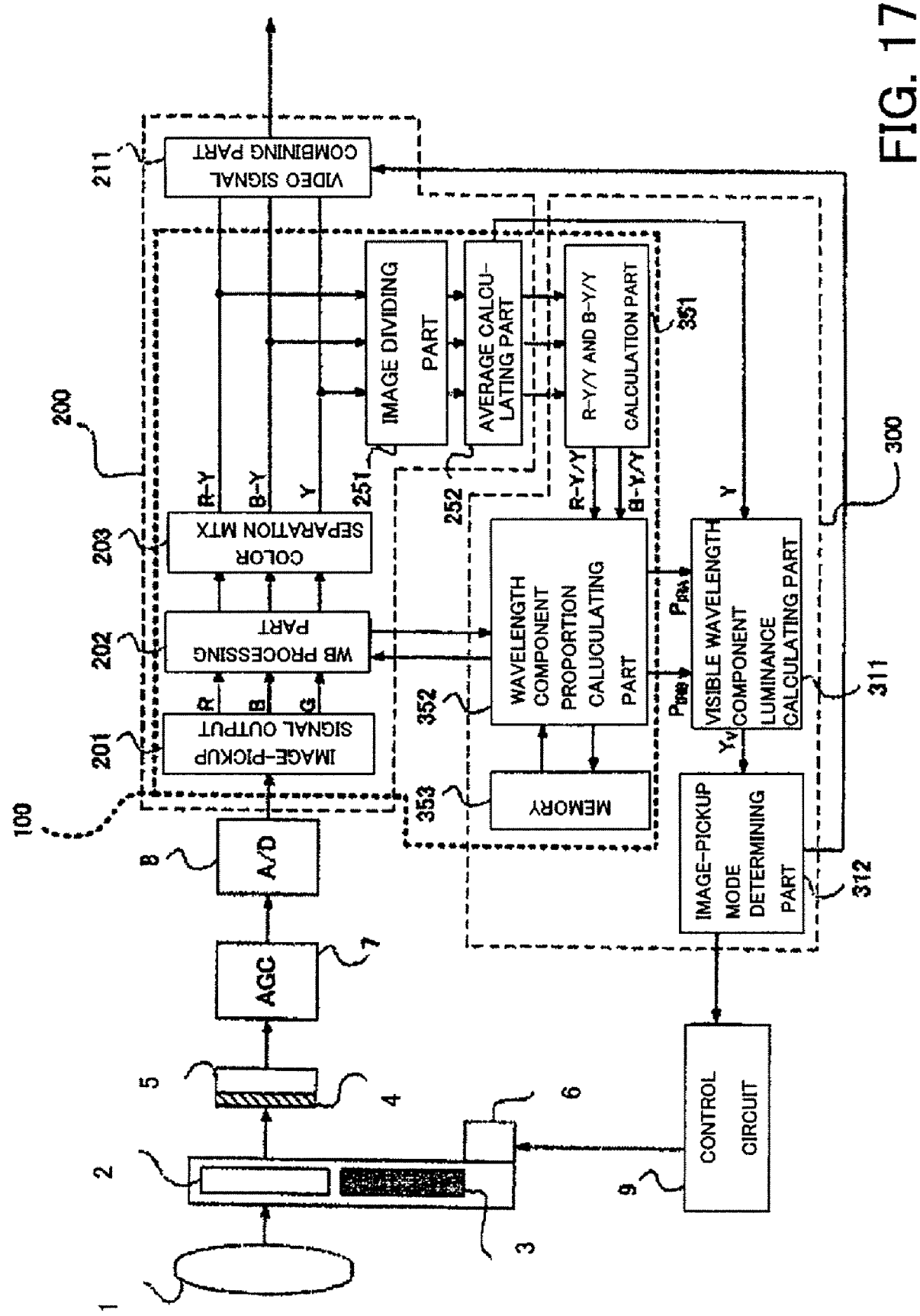
FIG. 17 is a diagram showing the configuration of a camera having the infrared cutting filter changing function, which is an image-pickup apparatus as an embodiment of the present invention that uses a wavelength proportion detection apparatus that is Embodiment 2 of the present invention.

In FIGS. 16 and 17, the components having the same functions as those in the embodiment shown in FIGS. 9 and 10 are indicated by the same reference numerals.

In an image-pickup optical system 1 shown in FIG. 17, reflected light from an object passes through an optical-path-length correcting filter 2 and enters an image-pickup element 5 via an image-pickup element color filter 4.

An analog image-pickup signal from the image-pickup element 5 is amplified by an amplifier 7 and converted into a digital image-pickup signal by an A/D converter 8.

An image-pickup signal output 201 is obtained by separating the image-pickup signal from the A/D converter 8 into a red signal R, a blue signal B and a green signal G.

A WB processing part 202 is a part for adjusting the R gain and B gain of the image pickup signal to achieve suitable white balance.

A color separation matrix (MTX) 203 is a processing part for converting the red signal R, blue signal B and green signal G adjusted to achieve suitable white balance into color-difference signals R-Y and B-Y and luminance signal Y.

The color-difference signals R-Y and B-Y and the luminance signal Y are combined into a video signal by a video signal combining part 211 to be output to outside.

When an infrared cutting filter 3 is removed and the optical-path-length correcting filter 2 is inserted, the color balance of the video signal is lost due to mixing of infrared light. In image pickup in the state where the optical-path-length correcting filter 2 is inserted, therefore, the video signal combining part 211 ordinarily outputs a black-and-white image based only on the luminance signal Y while discarding the color-difference signals R-Y and B-Y obtained from the color separation matrix 203.

The wavelength proportion detection apparatus 100 of this embodiment is an apparatus for detecting the proportions of wavelength components by using the color-difference signals R-Y and B-Y obtained in a video signal processing circuit 200 shown in FIG. 17.

Processing for detecting the proportions of wavelength components is a portion of calculation processing in the video signal processing circuit 200 and a microcomputer 300.

The image-pickup signal output 201 in the wavelength proportion detection apparatus shown in FIG. 16 is an output of the image-pickup signal obtained by the image-pickup element picking up an image formed of light with wavelengths from a visible wavelength region to an infrared wavelength region through the image-pickup optical system and the image-pickup element color filter.

In the camera having the infrared cutting filter changing function shown in FIG. 17, the image-pickup signal output 201 in the wavelength proportion detection apparatus shown in FIG. 16 is an output of the image-pickup signal obtained by performing image pickup in the state where the optical-path-length correcting filter 2 is inserted.

The WB processing part 202 adjusts the R gain and B gain of the image pickup signal to achieve suitable white balance.

However, the video signal in which light in the infrared wavelength region is mixed loses the color balance Therefore the R gain and B gain may be adjusted as fixed values.

The color separation matrix (MTX) 203 converts the red signal R, blue signal B and green signal G into the color-difference signals R-Y and B-Y and luminance signal Y.

The color-difference signals R-Y and B-Y and the luminance signal Y in the converted image-pickup signals are input to an image dividing part 251.

The image dividing part 251 is a processing part for dividing the color-difference signals and the luminance signals in the picked-up image into a plurality of areas. An average calculating part 252 averages the color-difference signals and the luminance signals in each of the plurality of divided areas.

If the number by which the picked-up image is divided in the image dividing part 251 is increased to segmentalize the image more finely, the extraction accuracy of the color-difference signals and the luminance signals is increased.

FIG. 11 shows changes of extracted colors and changes in luminance corresponding to the divided areas with the increase in the number by which the image is divided. When the number by which the image is divided is small, extracted information becomes mixed information of a color and luminance of the object and a color and luminance of the background. As the number by which the image is divided is increased, the separation between the colors and luminance of the object and the colors and luminance of the background becomes definite. When the number by which the image is divided is sufficiently large, the information on the object and the information on the background can be extracted as values close to the actual colors and luminance.

It is, therefore, desirable to extract the color-difference signal and the luminance signal by increasing the number by which the picked-up image is divided to segmentalize the image as finely as possible in order to increase the probability of success in accurately extracting the colors and luminance of the object in the picked-up image.

The color-difference signals R-Y and B-Y and luminance signal Y averaged and extracted by the image dividing part 251 and the average calculating part 252 are converted into R-Y/Y and B-Y/Y, i.e., the ratios of the color-difference signal to the luminance signal, in an R-Y/Y and B-Y/Y calculating part 351.

R-Y/Y and B-Y/Y, which are the ratios of the color-difference signal to the luminance signal are input to a wavelength component proportion calculating part 352.

The wavelength component proportion calculating part 352 determines the proportions of wavelength components by referring to the input color-difference signal-to-luminance signal ratios R-Y/Y and B-Y/Y, white balancing adjustment value in the WB processing part 202 and data stored in a memory 353.

Concrete processing in the wavelength component proportion calculating part 352 will be described with reference to FIG. 18. In step S550, the color-difference signal-to-luminance signal ratios R-Y/Y and B-Y/Y (average values) obtained from the R-Y/Y and B-Y/Y calculating part 351 in the areas divided by the image dividing part 251 are stored.

In step S551, the white balancing adjustment values in the WB processing part 202 are read out and a check is made as to whether or not any change in the values has been made after preceding processing.

The values of the ratios R-Y/Y and B-Y/Y of the color-difference signal to the luminance signal vary depending on the white balancing adjustment value.

Therefore, if a change in the white balancing value is recognized in step S551, a need arises for processing in step S522 described below.

That is, there is a need for processing in step S552 for rereading from the memory 353 the definition line and the specified coordinates in the orthogonal coordinate system formed by the R-Y/Y and B-Y/Y axes, which correspond to the present white balancing value.

If the color-difference signal-to-luminance signal ratios R-Y/Y and B-Y/Y have been extracted from the same picked-up image or if the white balancing adjustment value is the same as that for the picked-up image in the preceding processing, no change is made in the white balancing adjustment value and, therefore, processing in step S552 is not performed.

Also in a case where the white balancing adjustment value is fixed at all times in the WB processing part 202, processing in step S552 is not performed.

In step S553, the shortest distances between the color-difference signal-to-luminance signal ratios R-Y/Y and B-Y/Y and the definition line are calculated.

In step S554, the dispersion value of the shortest distance is calculated. In step S555, the dispersion value is stored.

In step S556, a check is made as to whether or not processing from step S553 to step S555 has been completed with respect to all the divided areas in the picked-up image.

If the processing has not been completed with respect to all the areas, the processing from step S553 to step S555 is repeated.

If the processing has been completed with respect to all the areas, the process advances to step S557 and processing for obtaining the sum total of the dispersion values stored in step S555 is performed.

In step S558, the proportion $P_{IRA}$ of an infrared wavelength component A that is a component in the first infrared wavelength region is determined by collating the sum total of the dispersion values calculated in step S557 and the correlation data between the sum total of the dispersion values and the proportion of the infrared wavelength component A stored in the memory 353 in advance.

In step S559, the shortest distances between the color-difference signal-to-luminance signal ratios R-Y/Y and B-Y/Y and the specified coordinates are calculated.

In step S560, the dispersion value of the shortest distances is calculated. In step S561, the dispersion value is stored.

In step S562, a check is made as to whether or not processing from step S559 to step S561 has been completed with respect to all the divided areas in the picked-up image.

If the processing has not been completed with respect to all the areas, the processing from step S559 to step S561 is repeated.

If the processing has been completed with respect to all the areas, the process advances to step S563 and processing for obtaining the sum total of the dispersion values stored in step S561 is performed.

In step S564, the proportion $P_{IRB}$ of an infrared wavelength component B that is a component in the second infrared wavelength region is determined by collating the sum total of the dispersion values calculated in step S563 and the correlation data between the sum total of the dispersion values and the proportion of the infrared wavelength component B stored in the memory 353 in advance.

Either of the processing from step S553 to step S558 for determining the proportion $P_{IRA}$ of the infrared wavelength component A and the processing from step S559 to step S564 for determining the proportion $P_{IRB}$ of the infrared wavelength component B may be performed before the other.

The proportion $P_{IRA}$ of the wavelength component A in the first infrared wavelength region and the proportion $P_{IRB}$ of the wavelength component B in the second infrared wavelength region calculated in processing performed by the wavelength proportion detection apparatus 100 shown in FIG. 17 are input to a visible wavelength component luminance calculating part 311. The visible wavelength component luminance calculating part 311 calculates the luminance of the visible wavelength component included in the light source by using the proportions $P_{IRA}$ and $P_{IRB}$ of the infrared wavelength components A and B and the average luminance Y of the entire picked-up image obtained from the average calculating part 252. The calculated luminance $Y_V$ of the visible wavelength component is input to an image pickup mode determining part 312.

The image pickup mode determining part 312 compares the input luminance $Y_V$ of the input visible wavelength component and an image pickup mode switching threshold value $Y_D$ set in advance to determine whether or not the image pickup mode should be changed.

Figure 18:
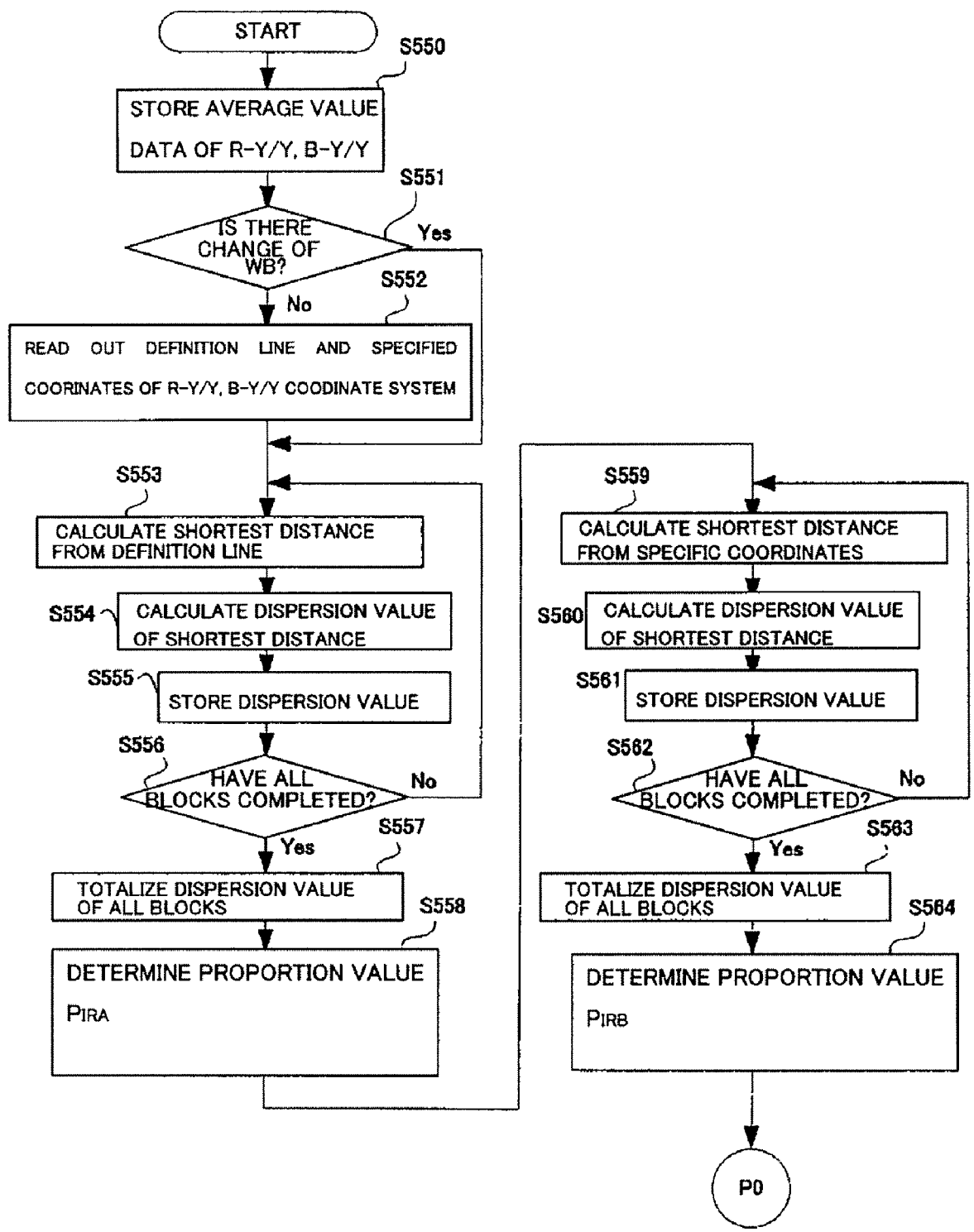
FIG. 18 is a flowchart of processing in a wavelength component proportion calculating part in Embodiment 2, which is adapted to image pickup under a low-luminance condition.

Processing performed in the visible wavelength component luminance calculating part 311 and the image pickup mode determining part 312 is a portion of the calculation processing in the microcomputer 300, which follows processing in the wavelength component proportion calculating part 352 (see FIG. 18).

Figure 13:
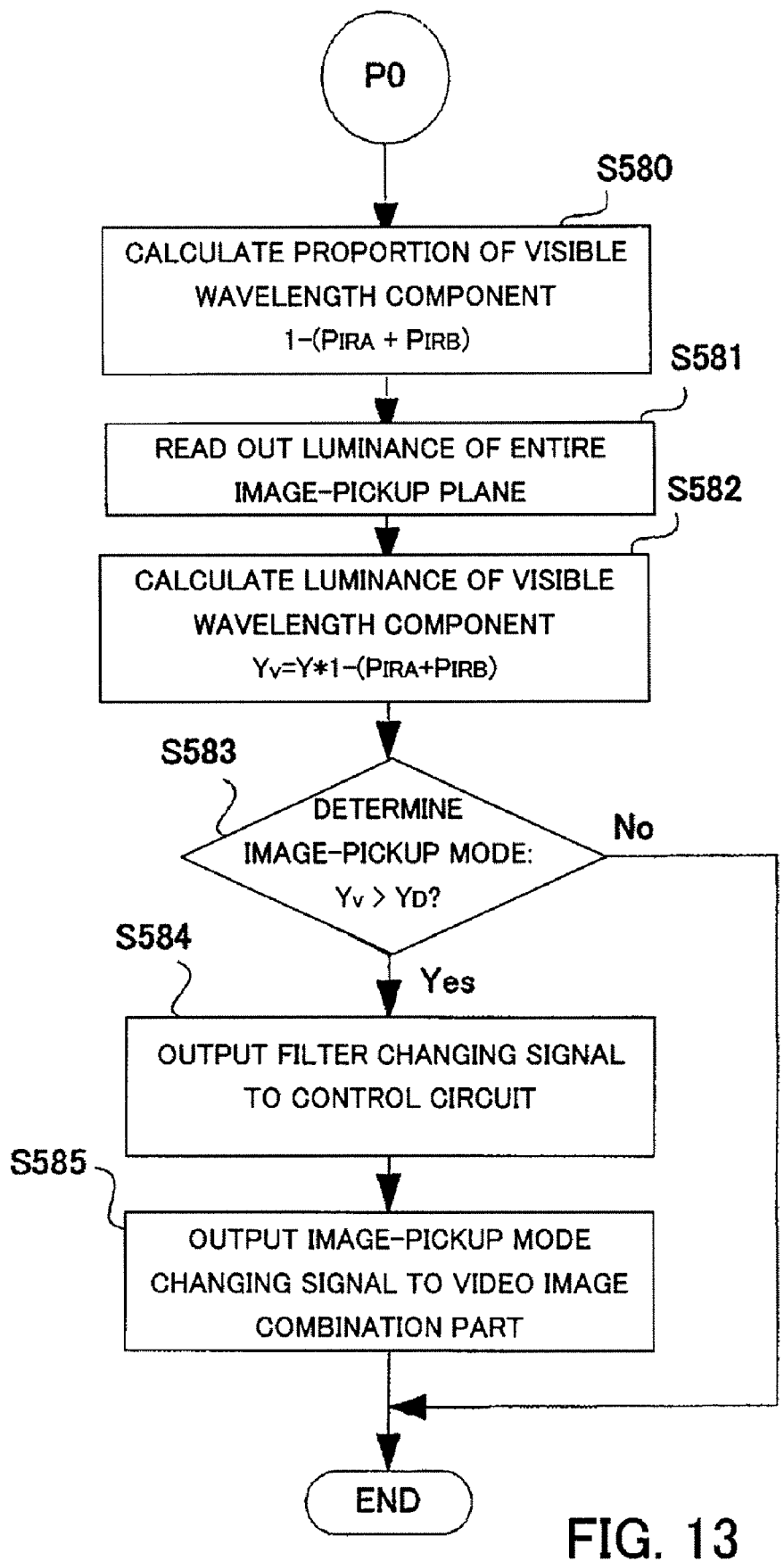
FIG. 13 is a flowchart of processing in a visible wavelength component luminance calculating part and an image pickup mode determining part in the wavelength proportion detection apparatus of Embodiment 1.

Processing performed in the visible wavelength component luminance calculating part 311 and the image pickup mode determining part 312 is the same as that in the embodiment shown in FIGS. 9 and 10, and is shown in FIG. 13.

In step S580, $1-(P_{IRA}+P_{IRB})$ is calculated from the values of the proportion $P_{IRA}$ of the first infrared wavelength region and the proportion $P_{IRB}$ of the second infrared wavelength region.

The proportion of the wavelength component included in the light source other than the wavelength components in the first and second infrared wavelength regions, i.e., the visible wavelength component, is calculated thereby.

In step S581, the average luminance Y of the entire picked-up image is obtained from the average calculating part 252.

In step S582, the luminance $Y_V$ of the visible wavelength component in the light source is calculated by multiplying the obtained average luminance Y by the proportion of the visible wavelength component calculated in step S580. The calculated luminance $Y_V$ of the visible wavelength component is input to the image pickup mode determining part 312. In step S583, comparison is made between the image pickup mode switching threshold value $Y_D$ set in advance and the luminance $Y_V$ of the visible wavelength component.

If the luminance $Y_V$ of the visible wavelength component is higher than the image pickup mode switching threshold value $Y_D$, it is determined that the image pickup mode should be changed. When this determination is made, a filter change signal is output to a control circuit 9 in step S584.

In step S585 after step S584, a signal is also output to the video signal combining part 211 to cause this part to stop discarding the color-difference signals R-Y and B-Y and to perform color video signal combining processing.

The control circuit 9 receives the signal from the image pickup mode determining part 312 and sends a filter drive control signal to a filter drive motor 6.

The video signal combining part 211 receives the signal from the image pickup mode determining part 312, stops discarding the color-difference signals R-Y and B-Y and outputs a color video signal by combining the color-difference signals R-Y and B-Y and the luminance signal Y.

The above-described configuration ensures that the luminance $Y_V$ of the visible wavelength component included in the light source can be detected with improved accuracy even under a low-luminance condition.

The configuration also ensures that the image pickup mode can be determined on the basis of the luminance $Y_V$ of the visible wavelength component and the image pickup mode switching threshold value $Y_D$ set in advance.

As a result, the luminance on the color picked-up image after insertion of the infrared cutting filter that was removed can be stabilized at a value in the vicinity of the image pickup mode switching threshold value $Y_D$ regardless of the amount of the infrared wavelength component included in the light source.

According to each of the above-described embodiments, as described above, detection can be performed to determine the proportion of the infrared component in the total amount of light received on the image-pickup plane (i.e., the image-pickup element) in the state where the infrared cutting filter is removed. It is, therefore, possible to predict the amount of the visible light component, i.e., the luminance of the picked-up image in the state where the infrared cutting filter is inserted. If timing of insertion of the infrared cutting filter is determined on the basis of the predicted luminance of the picked-up image, the luminance of the picked-up image after insertion of the infrared cutting filter can be stabilized.

Each of the image-pickup apparatuses of the above-described embodiments, which is a camera having an infrared cutting filter changing function, is provided with a wavelength component proportion detection apparatus to enable prediction of the luminance of the visible component when an infrared cutting filter is inserted. The image-pickup apparatus is therefore capable of automatically inserting the infrared cutting filter according to suitable timing regardless of kinds of light sources.

Furthermore, the present invention is not limited to these preferred embodiments and various variations and modifications may be made without departing from the scope of the present invention.

This application claims foreign priority benefits based on Japanese Patent Application No. 2005-278634, filed on Sep.

26, 2005, which is hereby incorporated by reference herein in its entirety as if fully set forth herein.

What is claimed is:

1. A wavelength proportion detection apparatus comprising:
   a color filter which transmits light from an object irradiated with light from a light source;
   an image-pickup element which outputs an image-pickup signal by converting light in a visible wavelength region and light in an infrared wavelength region transmitted through the color filter into an electrical signal;
   an extractor which extracts a color-difference signal from the image-pickup signal; and
   a detector which detects, on the basis of the extracted color-difference signal, the proportion of a wavelength component in a first infrared wavelength region and the proportion of a wavelength component in a second infrared wavelength region in the light from the light source, the first infrared wavelength region being a region in which the transmittance of the color filter for a red wavelength component is higher than the transmittances of the color filter for blue and green wavelength components, and the second infrared wavelength region being a region in which the difference between the transmittance of the color filter for the red wavelength component and the transmittances of the color filter for the blue and green wavelength components is smaller than that in the first infrared wavelength region.

2. The proportion detection apparatus according to claim 1, wherein the extractor extracts, from the image-pickup signals output from plural image-pickup areas on the image-pickup element, the color-difference signal averaged in each of the image-pickup areas; and
   the detector detects the proportions of the wavelength components in the first and second infrared wavelength regions in the light from the light source on the entire image-pickup element on the basis of the color-difference signals extracted from the plural image-pickup areas.

3. The proportion detection apparatus according to claim 2, wherein the detector detects the proportions of the wavelength components in the first and second infrared wavelength regions in the light from the light source by evaluating the degree of concentration of the distribution of the color-difference signals extracted from the plural image-pickup areas with respect to a definition line and specified coordinates which are set based on spectral transmittance characteristics of the color filter in an orthogonal coordinate system formed by an R-Y axis and a B-Y axis representing the color-difference signals.

4. The proportion detection apparatus according to claim 3, wherein the definition line is a line approximate to the distribution of the color-difference signals extracted from the plural image-pickup areas by irradiating the image-pickup element with single-wavelength light in the first infrared wavelength region in the orthogonal coordinate system, and
   the specified coordinates are coordinates approximate to coordinates on which the distribution of the color-difference signals extracted from the plural image-pickup areas by irradiating the image-pickup element with single-wavelength light in the second infrared wavelength region is concentrated in the orthogonal coordinate system.

5. The proportion detection apparatus according to claim 3, wherein the detector obtains first dispersion values of the shortest distances between the color-difference signals extracted from the plural image-pickup areas and the definition line in the orthogonal coordinate system and second dispersion values of the shortest distances between the color-difference signals and the specified coordinates in the orthogonal coordinate system,
   sets the sum total of the first dispersion values as a first evaluation value for the first infrared wavelength region and the sum total of the second dispersion values as a second evaluation value for the second infrared wavelength region, and
   detects the proportion of the wavelength component in the first infrared wavelength region in the light from the light source on the basis of the first evaluation value and correlation data between the sum total of the first dispersion values and the proportion of the wavelength component in the first infrared wavelength region with respect to a specific object, and the proportion of the wavelength component in the second infrared wavelength region in the light from the light source on the basis of the second evaluation value and correlation data between the sum total of the second dispersion values and the proportion of the wavelength component in the second infrared wavelength region with respect to the specific object.

6. An image-pickup apparatus comprising:
   the proportion detection apparatus according to claim 1;
   a filter transfer mechanism which inserts an infrared cutting filter in an optical path between an image-pickup optical system and the color filter, and which removes the infrared cutting filter from the optical path;
   a luminance calculator which calculates luminance of the visible wavelength component on the basis of a luminance signal obtained from the image pickup signal and the proportions of the wavelength components in the first and second infrared wavelength regions in the light from the light source which are obtained by the proportion detection apparatus; and
   a controller which operates the filter transfer mechanism on the basis of the calculated luminance of the visible wavelength component.

7. A wavelength proportion detection apparatus comprising:
   a color filter which transmits light from an object irradiated with light from a light source;
   an image-pickup element which outputs an image-pickup signal by converting light in a visible wavelength region and light in an infrared wavelength region transmitted through the color filter into an electrical signal;
   an extractor which extracts a color-difference signal and a luminance signal from the image-pickup signal; and
   a detector which detects, on the basis of the ratio of the extracted color-difference signal and luminance signal, the proportion of a wavelength component in a first infrared wavelength region and the proportion of a wavelength component in a second infrared wavelength region in the light from the light source, the first infrared wavelength region being a region in which the transmittance of the color filter for a red wavelength component is higher than the transmittances of the color filter for blue and green wavelength components, and the second infrared wavelength region being a region in which the difference between the transmittance of the color filter for the red wavelength component and the transmittances of the color filter for the blue and green wavelength components is smaller than that in the first infrared wavelength region.

8. The proportion detection apparatus according to claim 7, wherein the extractor extracts, from the image-pickup signals output from plural image-pickup areas on the image-pickup element, the color-difference signal and luminance signal each averaged in each of the image-pickup areas; and the detector detects the proportions of the wavelength components in the first and second infrared wavelength regions in the light from the light source on the entire image-pickup element on the basis of the ratios of the extracted color-difference signals to luminance signals extracted from the plural image-pickup areas.

9. The proportion detection apparatus according to claim 8, wherein the detector detects the proportions of the wavelength components in the first and second infrared wavelength regions in the light from the light source by evaluating the degree of concentration of the distribution of the ratios with respect to a definition line and specified coordinates which are set based on spectral transmittance characteristics of the color filter in an orthogonal coordinate system formed by an R-Y/Y axis and a B-Y/Y axis representing the ratios of the color-difference signal and the luminance signal.

10. The proportion detection apparatus according to claim 9, wherein the definition line is a line approximate to the distribution of the ratios obtained by irradiating the image-pickup element with single-wavelength light in the first infrared wavelength region in the orthogonal coordinate system, and the specified coordinates are coordinates approximate to coordinates on which the distribution of the ratios obtained by irradiating the image-pickup element with single-wavelength light in the second infrared wavelength region is concentrated in the orthogonal coordinate system.

11. The proportion detection apparatus according to claim 9, wherein the detector obtains first dispersion values of the shortest distances between the ratios and the definition line in the orthogonal coordinate system and second dispersion values of the shortest distances between the ratios and the specified coordinates in the orthogonal coordinate system, sets the sum total of the first dispersion values as a first evaluation value for the first infrared wavelength region and the sum total of the second dispersion values as a second evaluation value for the second infrared wavelength region, and detects the proportion of the wavelength component in the first infrared wavelength region in the light from the light source on the basis of the first evaluation value and correlation data between the sum total of the first dispersion values and the proportion of the wavelength component in the first infrared wavelength region with respect to a specific object, and the proportion of the wavelength component in the second infrared wavelength region in the light from the light source on the basis of the second evaluation value and correlation data between the sum total of the second dispersion values and the proportion of the wavelength component in the second infrared wavelength region with respect to the specific object.

12. An image-pickup apparatus comprising:
the proportion detection apparatus according to claim 7;
a filter transfer mechanism which inserts an infrared cutting filter in an optical path between an image-pickup optical system and the color filter, and which removes the infrared cutting filter from the optical path;
a luminance calculator which calculates luminance of the visible wavelength component on the basis of a luminance signal obtained from the image pickup signal and the proportions of the wavelength components in the first and second infrared wavelength regions in the light from the light source which are obtained by the proportion detection apparatus; and
a controller which operates the filter transfer mechanism on the basis of the calculated luminance of the visible wavelength component.

13. A wavelength proportion detection method using a color filter which transmits light from an object irradiated with light from a light source, and an image-pickup element which outputs an image-pickup signal by converting light in a visible wavelength region and light in an infrared wavelength region transmitted through the color filter into an electrical signal, the method comprising the steps of:

extracting a color-difference signal from the image-pickup signal; and detecting, on the basis of the extracted color-difference signal, the proportion of a wavelength component in a first infrared wavelength region and the proportion of a wavelength component in a second infrared wavelength region in the light from the light source, the first infrared wavelength region being a region in which the transmittance of the color filter for a red wavelength component is higher than the transmittances of the color filter for blue and green wavelength components, and the second infrared wavelength region being a region in which the difference between the transmittance of the color filter for the red wavelength component and the transmittances of the color filter for the blue and green wavelength components is smaller than that in the first infrared wavelength region.

14. A wavelength proportion detection method using a color filter which transmits light from an object irradiated with light from a light source, and an image-pickup element which outputs an image-pickup signal by converting light in a visible wavelength region and light in an infrared wavelength region transmitted through the color filter into an electrical signal, the method comprising the steps of:

extracting a color-difference signal and a luminance signal from the image-pickup signal; and detecting, on the basis of the ratio of the extracted color-difference signal and luminance signal, the proportion of a wavelength component in a first infrared wavelength region and the proportion of a wavelength component in a second infrared wavelength region in the light from the light source, the first infrared wavelength region being a region in which the transmittance of the color filter for a red wavelength component is higher than the transmittances of the color filter for blue and green wavelength components, and the second infrared wavelength region being a region in which the difference between the transmittance of the color filter for the red wavelength component and the transmittances of the color filter for the blue and green wavelength components is smaller than that in the first infrared wavelength region.

* * * * *